United States Patent [19]
Sashida

[11] Patent Number: 6,078,383
[45] Date of Patent: Jun. 20, 2000

[54] FILM CARRIER

[75] Inventor: Minoru Sashida, Chichibu, Japan

[73] Assignee: Canon Denshi Kabushiki Kaisha, Saitama-ken, Japan

[21] Appl. No.: 09/069,774

[22] Filed: Apr. 30, 1998

[30] Foreign Application Priority Data

| | | | |
|---|---|---|---|
| May 9, 1997 | [JP] | Japan | 9-135919 |
| May 9, 1997 | [JP] | Japan | 9-135920 |

[51] Int. Cl.[7] .......................... G03B 27/62; G03B 27/52; G03B 23/02
[52] U.S. Cl. .................. 355/75; 355/40; 353/25
[58] Field of Search .................. 355/75, 27, 28, 355/40, 41; 353/25, 26 R, 26 A

[56] References Cited

U.S. PATENT DOCUMENTS

| | | | |
|---|---|---|---|
| 4,752,124 | 6/1988 | Ueda et al. | 353/26 R |
| 4,936,677 | 6/1990 | Koumura et al. | 353/26 A |
| 5,020,900 | 6/1991 | Sashida et al. | 353/26 R |
| 5,092,535 | 3/1992 | Murata et al. | 242/195 |
| 5,642,925 | 7/1997 | Yamamoto et al. | 353/26 R |
| 5,673,104 | 9/1997 | Rottner | 355/75 |
| 5,995,204 | 11/1999 | Hoshino et al. | 355/75 |

FOREIGN PATENT DOCUMENTS

| | | |
|---|---|---|
| 4-124621 | 4/1992 | Japan . |
| 4-125622 | 4/1992 | Japan . |

*Primary Examiner*—Alan A. Mathews
*Assistant Examiner*—Hung Henry Nguyen
*Attorney, Agent, or Firm*—Fitzpatrick, Cella, Harper & Scinto

[57] ABSTRACT

A film carrier includes a roll carrier for supplying and returning a rolled film between a supply reel and a take-up reel to retrieve any frame on the film, and a fiche carrier for holding a sheet film and capable of retrieving any frame on the film. A pedestal portion, including guides, shifts the roll carrier and the fiche carrier in the same plane between respective predetermined retard positions and respective application positions.

13 Claims, 13 Drawing Sheets

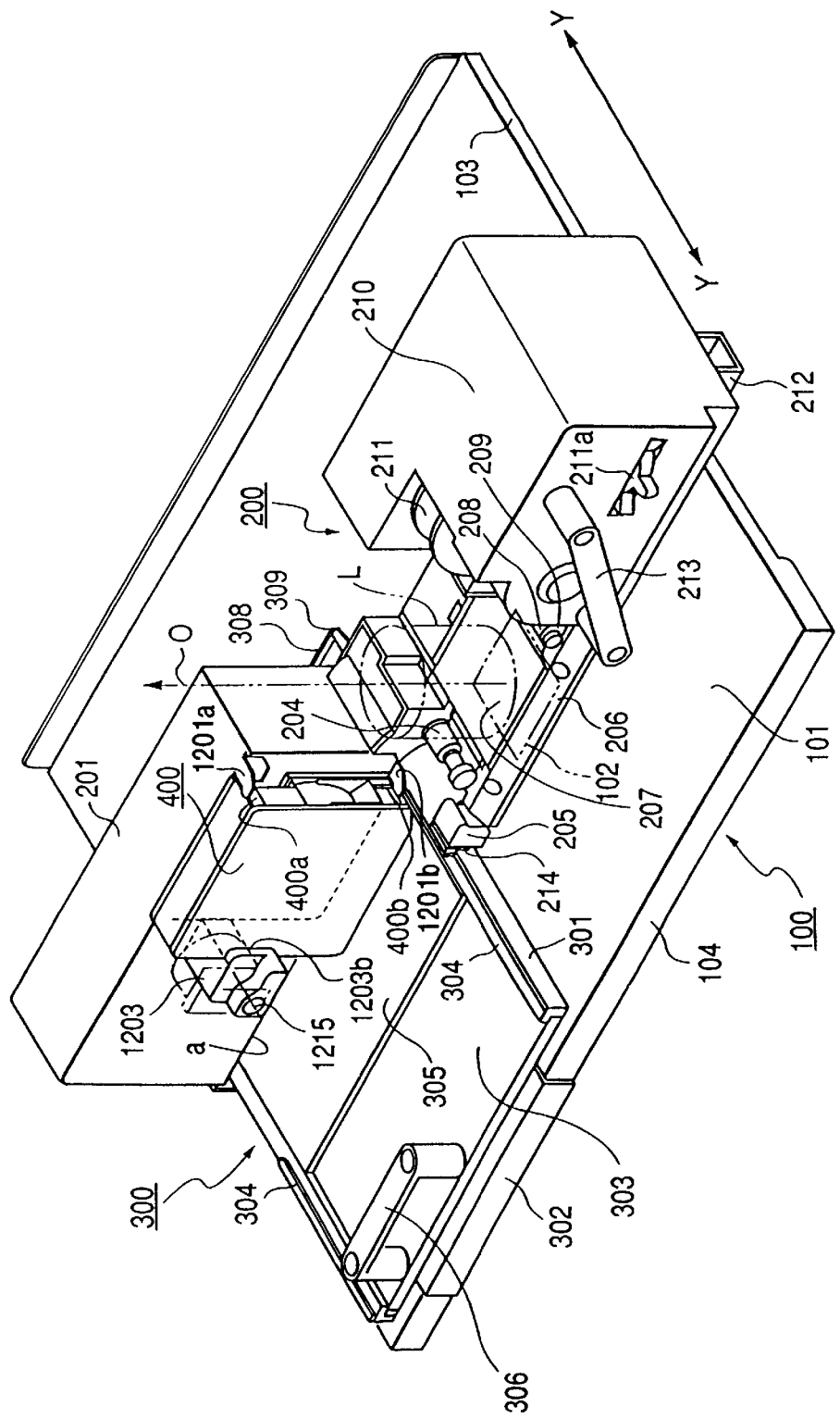

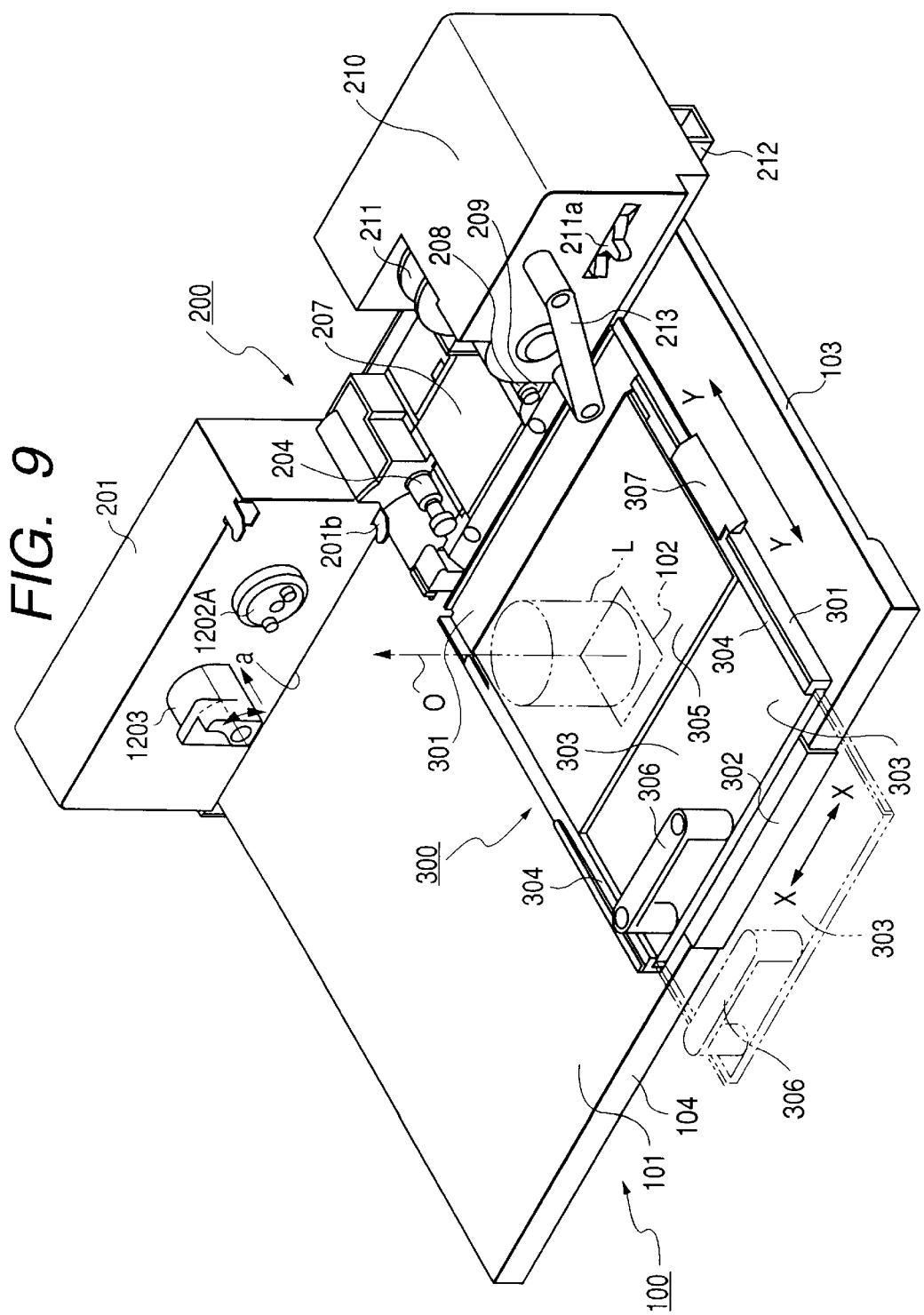

FILM CARRIER

BACKGROUND OF THE INVENTION

1. Field of the Invention

The present invention relates to a film carrier in which both a rolled film and a sheet film can be used and which is mounted on a film projecting device such as a microfilm reader, a microfilm reader printer and the like.

2. Related Background Art

Readers for projecting information recorded on a microfilm with an enlarged scale to facilitate inspection of the information and reader printers for printing out such information if necessary have widely been used as microfilm equipments.

The microfilms can be generally divided into a rolled film and a sheet film.

The rolled film is obtained by rolling an elongated film on which a number of frames are recorded. The rolled film can be wound around a supply reel (open-reel type), and the supply reel with the rolled film may be contained within a cartridge (cartridge type).

The sheet film may include a micro fiche film on which many information frames are recorded in a matrix fashion, an aperture card, a jacket or the like.

The film carriers may be divided into a rolled film carrier (referred to as "roll carrier" hereinafter) which is mounted on a film projecting device such as a microfilm reader, a microfilm reader printer and the like so that the rolled film can be fed out from a supply reel and returned to a take-up reel by the carrier to retrieve a desired information frame recorded on the film and to bring such a frame to a projecting light path portion, and sheet film carrier (referred to as "fiche carrier" hereinafter) for shifting the sheet film in two-dimensional directions to retrieve a desired information frame recorded on the film and to bring such a frame to a projecting light path portion.

In the past, a film carrier in which both the rolled film of open-reel type and the sheet film can be used has been proposed, as disclosed in Japanese Patent Laid-Open Application No. 4-125622 (1992). In this film carrier, when the rolled film is used, by retarding a fiche carrier out of a projecting light path, a pair of glass plates defining a rolled film convey path are brought into the projecting light path, and, thereafter, by bridging the rolled film between a supply reel and a take-up reel, the rolled film can be used. Further, when the rolled film is not existed between the glass plates of the carrier, by retarding the pair of glass plates out of the projecting light path in synchronous with the shifting movement of the fiche carrier into the projecting light path, the sheet film can be used.

Japanese Patent Laid-Open Application No. 4-124621 (1992) disclosed a film carrier having a roll carrier portion and a fiche carrier disposed at a front end of the roll carrier for shifting movement in a left-and-right direction and in which the roll carrier portion and the sheet film can be integrally shifted in a front-and-rear direction. Also in this film carrier, both the rolled film and the sheet film can be used.

In the above-mentioned conventional film carriers in which both the rolled film and the sheet film can be used, for example, in a condition that the rolled film can be used, the fiche film cannot be used. Accordingly, application in which the index is retrieved in the film sheet such as the fiche film and thereafter the frame in the rolled film is retrieved cannot be achieved.

Further, when the rolled film is switched to the sheet film, the switching of the rolled film convey path must be effected, which makes a mechanism of the roll carrier portion more complicated.

In the film carriers in which the roll carrier and the fiche carrier are shifted together in the front-and-rear direction, since the roll carrier portion is situated behind the fiche carrier, the portion to be operated by the operator is positioned remote from the operator. And, in this case, since the fiche carrier is located between the operator and the roll carrier, the operability is worsened. Further, during the retrieval of the sheet film, since the roll carrier is also shifted, the moving mass is increased.

In the conventional film carriers, for example, a cartridge of closed-reel type cannot be used as the rolled film. The reason is that the required configurations of the film supply shafts are changed in dependence upon the types of the rolled films, and the outer dimension of the cartridge is greater than that of the reel on which the rolled film of open-reel type is wound, so that, when it is designed to permit the application of both the rolled film and the sheet film, it is difficult to install the film carrier in the limited space of the reader or the reader printer. Particularly, in the latter case, it is very difficult to mount and dismount the cartridge with respect to the carrier, thereby making practical use thereof difficult.

SUMMARY OF THE INVENTION

An object of the present invention is to provide a film carrier in which both a rolled film and a sheet film can be used and in which some of the above-mentioned conventional drawbacks can be eliminated, namely, in which the sheet film can be used while the rolled film is still loaded and the rolled film can be used while the sheet film is still loaded, and the switching between roll carrier and a fiche carrier can easily be effected to improve operability.

Another object of the present invention is to provide a film carrier in which both a rolled film and a sheet film can be used and in which some of the above-mentioned conventional drawbacks can be eliminated, namely, in which the sheet film can be used while the rolled film is still loaded and the rolled film can be used while the sheet film is still loaded, and an open-reel type or a cartridge type can selectively be used as the rolled film, and the mounting and dismounting of a roll carrier for the rolled film of cartridge type with respect to the film supply portion can be effected easily and correctly with a simple construction, and the switching between the roll carrier and a fiche carrier can easily be effected to improve operability.

According to the present invention, there is provided a film carrier which is mounted on a film projecting device and in which both a rolled film and a sheet film can be used, the film carrier comprising a film conveying mechanism for holding the rolled film and for supplying and returning the rolled film between a supply reel and a take-up reel, a roll carrier having a pair of transparent plates defining a film convey path therebetween and shiftable in a transverse direction perpendicular to a film conveying direction, a fiche carrier for holding a sheet film between the paired transparent plates and shiftable in the film conveying direction and the transverse direction, and a pedestal portion including guide portions for shifting the roll carrier and the fiche carrier horizontally in the same plane between respective predetermined retard positions and respective application positions.

When one of the roll carrier and the fiche carrier tries to be shifted from its predetermined retard position to its application position, if the other carrier is not located at its predetermined retard position, a part of members constituting the other carrier may prevent one carrier from shifting to the application position.

A gravity center of the roll carrier may be located in the vicinity of the guide member for shifting the roll carrier.

In the present invention, since the roll carrier and the fiche carrier can be shifted independently in the same plane, the carrier switching operations for the both carriers can be simplified, thereby preventing mis-operation.

Since the sheet film can be used while the rolled film is still loaded or the rolled film can be used while the sheet film is still loaded to permit the switching between the rolled film and the sheet film, the rolled film and the sheet film can be switched properly, thereby performing the retrieval efficiently.

By using the arrangement in which, when one of the roll carrier and the fiche carrier tries to be shifted to its application position, if the other carrier is not located at its predetermined retard position, the part of the members constituting the other carrier prevents one carrier from shifting to its application position, the mis-operation can be avoided without providing any special lock mechanisms.

By arranging parts required to constitute the roll carrier at a local position on the film take-up portion of the roll carrier, since the gravity center of the roll carrier is located in the vicinity of the guide portion of the pedestal portion for shifting the roll carrier, moment is not generated during the shifting movement of the carrier effected by a grip for shifting the roll carrier, thereby achieving smooth movement of the roll carrier.

The present invention further provides a film carrier which is mounted on a film projecting device and in which both a rolled film and a sheet film can be used, the film carrier comprising a film conveying mechanism for holding a rolled film of open-reel type or a rolled film contained in a cartridge at a film supply portion and for supplying and returning the rolled film between the film supply portion and a take-up reel, a roll carrier having a pair of transparent plates defining a film convey path therebetween and shiftable in a transverse direction perpendicular to a film conveying direction, a fiche carrier for holding a sheet film between the paired transparent plates and shiftable in the film conveying direction and the transverse direction, and a pedestal portion including guide portions for shifting the roll carrier and the fiche carrier horizontally in the same plane between respective predetermined retard positions and respective application positions, and wherein, in the film supply portion of the roll carrier, a film supply shaft can be exchanged in accordance with a kind of the rolled film held at the film supply portion, and, when the rolled film contained in the cartridge is mounted and dismounted with respect to the film supply portion of the roll carrier, a lower surface of the cartridge is received on an upper surface of a projection glass portion of the fiche carrier to provide a cartridge mounting/dismounting guide surface for the film supply portion of the roll carrier.

The present invention also provides a film carrier which is mounted on a film projecting device and in which both a rolled film and a sheet film can be used, the film carrier comprising a roll carrier for holding a rolled film of open-reel type or a rolled film contained in a cartridge at a film supply portion and for supplying and returning the rolled film between the film supply portion and a take-up reel to retrieve any frame recorded on the film, a fiche carrier for holding a sheet film between upper and lower glass plates of a projection glass portion and capable of retrieving any frame recorded on the film, and a pedestal portion including guide portions for shifting the roll carrier and the fiche carrier horizontally in the same plane between respective predetermined retard positions and respective application positions, and wherein, in the film supply portion of the roll carrier, a film supply shaft can be exchanged in accordance with a kind of the rolled film held at the film supply portion, and, when the rolled film contained in the cartridge is mounted and dismounted with respect to the film supply portion of the roll carrier, a lower surface of the cartridge is received on an upper surface of the projection glass portion of the fiche carrier or on a part of the fiche carrier situated at a position substantially the same height as the upper surface of the projection glass portion to provide a cartridge mounting/dismounting guide surface for the film supply portion of the roll carrier.

The cartridge containing the rolled film may be mounted on and secured to the film supply portion of the roll carrier by two hook pawls to be hooked to upper and lower recessed portions disposed at a film discharge opening of the cartridge and a cartridge securing member for urging a surface of the cartridge opposite to the film discharge opening in a direction perpendicular to a film conveying direction while urging the surface toward the hook pawls.

In this film carrier, when one of the roll carrier and the fiche carrier tries to be shifted from its predetermined retard position to its application position, if the other carrier is not located at its predetermined retard position, a part of members constituting the other carrier may prevent one carrier from shifting to the application position.

Further, in this film carrier, a gravity center of the roll carrier may be located in the vicinity of the guide member for shifting the roll carrier.

In this film carrier, since the roll carrier and the fiche carrier can be shifted independently in the same plane, the carrier switching operations for both carriers can be simplified, thereby preventing mis-operation.

Further, in this film carrier, since the sheet film can be used while the rolled film is still loaded or the rolled film can be used while the sheet film is still loaded to permit the switching between the rolled film and the sheet film, the rolled film and the sheet film can be switched properly, thereby performing the retrieval efficiently.

In this film carrier, by using the arrangement in which, when one of the roll carrier and the fiche carrier tries to be shifted to its application position, if the other carrier is not located at its predetermined retard position, the part of the members constituting the other carrier prevents one carrier from shifting to its application position, the mis-operation can be avoided without providing any special lock mechanism.

Further, in this film carrier, by arranging parts required to constitute the roll carrier at a local position on the film take-up portion of the roll carrier, since the gravity center of the roll carrier is located in the vicinity of the guide portion of the pedestal portion for shifting the roll carrier, moment is not generated during the shifting movement of the carrier effected by a grip for shifting the roll carrier, thereby achieving smooth movement of the roll carrier.

Since the upper surface of the projection glass portion of the fiche carrier or the part of the fiche carrier situated at the position substantially the same height as the upper surface of the projection glass portion is used as the cartridge mounting/dismounting guide surface for the film supply portion of the roll carrier, the mounting and dismounting of the cartridge can be effected easily and positively without providing any special guide surface for guiding the mounting/dismounting of the cartridge, thereby improving the operability.

When the part (cartridge mounting/dismounting guide surface) of the fiche carrier situated at the position substantially the same height as the upper surface of the projection glass portion is arranged in front of the projection glass portion, since the cartridge can be mounted and dismounted in a condition that the roll carrier is retracted from the projection device toward a front side to more extent than the case where the upper surface of the projection glass portion is used as the cartridge mounting/dismounting guide surface, the operability is further improved.

Since the cartridge containing the rolled film is mounted on and secured to the film supply portion of the roll carrier by the two hook pawls to be hooked to the upper and lower recessed portions disposed at the film discharge opening of the cartridge and the cartridge securing member for urging the surface of the cartridge opposite to the film discharge opening in the direction perpendicular to the film conveying direction while urging the surface toward the hook pawls, the cartridge can be firmly held without any play by using a simple construction.

BRIEF DESCRIPTION OF THE DRAWINGS

FIG. 7 is a perspective view of the film carrier of FIG. 6, showing a condition that the roll carrier is located at its application position;

FIG. 9 is a perspective view of the film carrier of FIG. 6, showing a condition that the fiche carrier is located at its application position;

DETAILED DESCRIPTION OF THE PREFERRED EMBODIMENTS

The present invention will now be explained in connection with embodiments thereof with reference to the accompanying drawings.

First of all, a film carrier A according to the first preferred embodiment of the present invention will be described.

Figure 1:
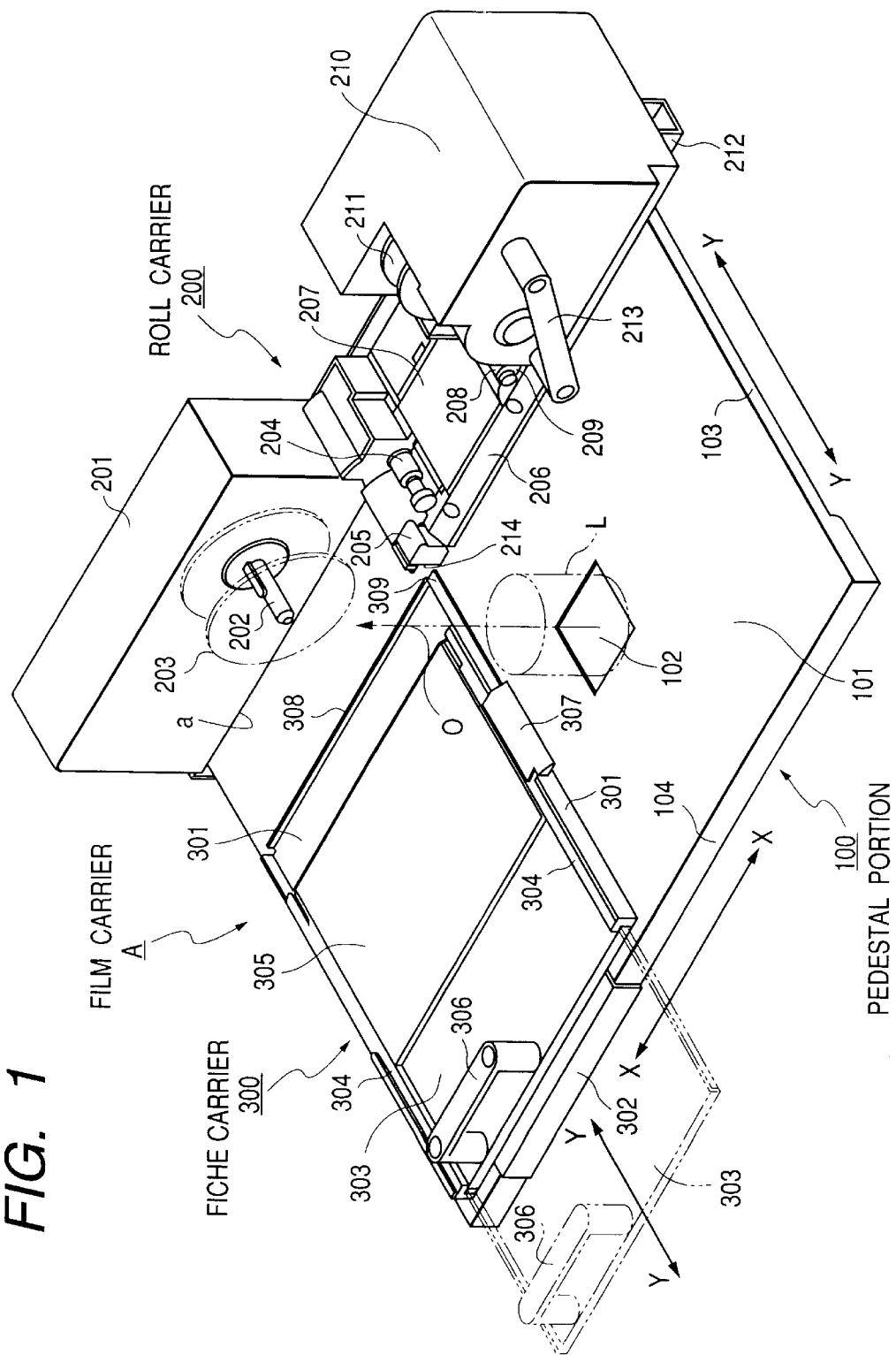
FIG. 1 is a perspective view of a film carrier according to an embodiment of the present invention, showing a condition that both a roll carrier and a fiche carrier are located at their retard positions.

In FIG. 1, the film carrier A comprises a pedestal portion 100, and a roll carrier 200 and a fiche carrier 300 mounted on the pedestal portion 100.

a) Pedestal Portion 100

The pedestal portion 100 is formed from a rectangular plate, and the roll carrier 200 and the fiche carrier 300 are mounted on an upper surface (table surface) 101 of the pedestal portion for shifting movement.

An aperture portion (film illumination portion) 102 is formed in the table surface 101 of the pedestal portion 100 at a predetermined position.

The film carrier A is incorporated into and mounted on a film projecting device (not shown) such as a microfilm reader, a microfilm reader printer or the like by positioning the film carrier with respect to a film carrier mounting portion of the film projecting device and securing the pedestal portion 100 to the film projecting device by means of a securing means.

In a condition that the film carrier A is properly incorporated into the film projecting device, the aperture portion 102 of the table surface 101 of the pedestal portion 100 is aligned with a vertical film projecting path O of the film projecting device, and a film illumination means (not shown) of the film projecting device is positioned below the aperture portion 102 and a projection lens barrel L of the film projecting device is positioned above the aperture portion 102.

The projection lens barrel L of the film projecting device is held by a holder (not shown) for vertical movement and is always biased downwardly by its own weight or a relatively weak spring.

The roll carrier 200 can be slid on the table surface 101 of the pedestal portion 100 within a front-and-rear direction distance range defined by front and rear stoppers (not shown) in a Y—Y direction while being guided by a right side 103 of the pedestal portion 100.

The fiche carrier 300 can be slid on the table surface 101 of the pedestal portion 100 within a left-and-right direction distance range defined by left and right stoppers (not shown) in an X—X direction while being guided by a front side 104 of the pedestal portion 100.

b) Roll Carrier 200

In the roll carrier 200, a film supply portion 201 for loading and holding a rolled film has a casing (housing) within which a film rewind motor for rotatingly driving a supply shaft 202 in a film rewind direction is housed.

The supply shaft 202 is protruded forwardly from a front surface of the casing of the film supply portion 201, and, in the illustrated embodiment, a rolled film of open-reel type (referred to as "open-reel" hereinafter) 203 is mounted on the supply shaft 202.

An encoder (not shown) for detecting a speed of the film is attached to a first film guide roller 204.

A grip 205 is used to load the film initially.

A guide member 206 serves to guide the film and also acts as a guide portion for resting the projection lens barrel L on a projection glass portion 207.

The projection glass portion 207 includes two upper and lower glass plates, and the film guide member 206 also holds these glass plates. The lower glass plate is controlled to shift toward and away from the upper glass plate in accordance with a conveying speed of the film so that, when the film is stopped to inspect the film or when the film is conveyed at a low speed during the flow-reading of the film, the lower glass plate is lifted to pinch the film between the upper and lower glass plates.

A second film guide roller 208 is disposed in an opposed relation to the first film guide roller 204 with the interposition of the projection glass portion 207.

A film take-up portion 210 has a casing within which a film take-up motor for rotatingly driving a film take-up reel 211 in a film take-up direction, a solenoid for shifting the lower glass plate of the projection glass portion 207 in the vertical direction, and a controller PCB for controlling the operation of the film carrier are housed.

A film guide 209 serves to direct the film from the second film guide roller 208 to the take-up reel 211.

A slider 212 integrally formed with a lower surface of the film take-up portion 210 is engaged by the right side 103 of the pedestal portion to be slid along the right side 103. The roll carrier 200 can be slid on the table surface 101 of the pedestal portion 100 within the front-and-rear direction distance range defined by the front and rear stoppers (not shown) in the Y—Y direction while being guided by the slider 212 engaging with the right side 103 of the pedestal portion.

A grip 213 provided on a front surface side of the casing of the film take-up portion 210 serves to help the shifting movement of the roll carrier 200 in the Y—Y direction.

An abutment portion 214 can abut against the fiche carrier 300.

c) Fiche Carrier 300

In the fiche carrier 300, a slider 302 integrally formed with a front side of a first frame 301 can be engaged by the front side 104 of the pedestal portion to slide along the front side 104. The fiche carrier 300 can be slid on the table surface 101 of the pedestal portion 100 within the left-and-right direction distance range defined by the left and right stoppers (not shown) in the X—X direction while being guided by the slider engaging with the front side 104 of the pedestal portion 100.

A second frame 303 is provided on the first frame 301. Left and right sides of the second frame are engaged by front and rear guide portions 303, 304 of the first frame 301 so that the second frame can be slid on the first frame 301 within a front-and-rear direction distance range defined by front and rear stoppers (not shown) in the Y—Y direction.

The second frame 303 is provided with a projection glass portion 305 which is constituted by upper and lower glass plates between which a sheet film is pinched and held.

The second frame 303 is further provided with a grip 306. By using the grip 306, the first frame 301 and accordingly the entire fiche carrier 300 can be slid on the table surface 101 of the pedestal portion 100 in the X—X direction while being guided by the front side 104 of the pedestal portion. Further, by using the grip 306, the second frame 303 can be slid on the first frame 301 in the Y—Y direction.

Although not shown in detail, in FIG. 1, by drawing and sliding the second frame 303 on the first frame 301 toward a front side in the Y—Y direction until it abuts against the front stopper, as shown by the two dot and chain line, the upper glass plate (of the two plates constituting the projection glass portion 305) is rotated and opened with respect to the lower glass plate. In a condition that the upper glass plate is rotated and opened, the sheet film is rested on the lower glass plate. Then, when the second frame 303 is slid on the first frame 301 toward a rear side in the Y—Y direction, the upper glass plate is rotated and closed with respect to the lower glass plate, thereby pinching and holding the sheet film between the upper and lower glass plates.

A guide portion 307 disposed on the right side of the first frame 301 at a central portion thereof serves to reset the projection lens barrel L on the projection glass portion 305.

The first frame 301 is provided with abutment portions 308, 309 which can abut against the roll carrier 200.

d) Carrier Switching

1) FIG. 1 shows a condition that both the roll carrier 200 and the fiche carrier 300 are positioned at predetermined "retard positions" spaced apart from "application positions" where the projection glass portion 207 or 305 is disposed on a film projecting light path O of the film projecting device.

In the illustrated embodiment, the predetermined retard position of the roll carrier 200 is a rear side position on the table surface 101 of the pedestal portion 100 in the Y—Y direction, as shown. In this retard position, the roll carrier 200 abuts against the rear stopper (not shown) not to further shift toward the rear side.

The retard position of the fiche carrier 300 is a left side position on the table surface 101 of the pedestal portion 100 in the X—X direction, as shown. In this retard position, the fiche carrier 300 abuts against the left stopper (not shown) not to further shift toward the left side.

Figure 2:
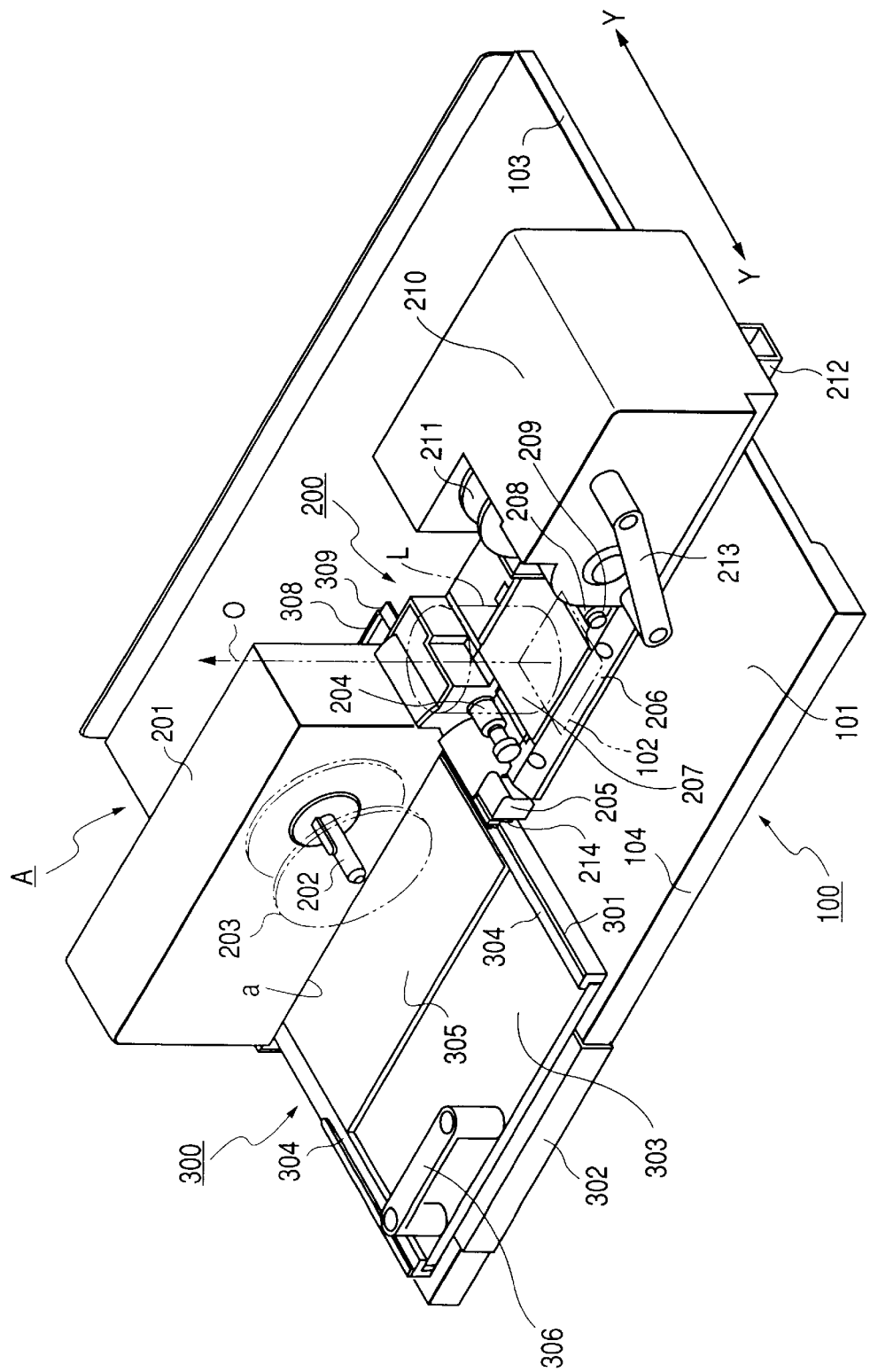
FIG. 2 is a perspective view of the film carrier, showing a condition that the roll carrier is located at its application position.

2) FIG. 2 shows a condition that the roll carrier 200 was shifted from the predetermined retard position shown in FIG. 1 to the application position.

That is to say, in the condition that both the roll carrier 200 and the fiche carrier 300 are located at the predetermined retard positions as shown in FIG. 1, by using the grip 213 provided on the front side of the casing of the film take-up portion 210, the roll carrier 200 is slid on the table surface 101 of the pedestal portion 100 toward the front side until the roll carrier abuts against the front stopper (not shown). As a result, the roll carrier 200 is shifted to the application portion where the projection glass portion 207 is positioned on the film projecting light path O of the film projecting device.

In this case, the bottom of the film supply portion 201 of the roll carrier 200 is floating from the table surface 101 of the pedestal portion 100 to form a gap a (between the film supply portion and the table surface 101 of the pedestal portion 100) through which the fiche carrier 300 can be shifted, so that, when the roll carrier 200 is shifted toward the front side in the Y—Y direction, so long as the fiche carrier 300 is located at the predetermined retard position, the film supply portion 201 of the roll carrier 200 can be slid over the fiche carrier 300 without interference.

While the roll carrier 200 is being shifted from the retard position to the application position, the lower end of the projection lens barrel L is guided by the film guide portion 206 to ride on the upper glass plate of the projection glass portion 207. In a condition that the roll carrier 200 was shifted to the predetermined application position, the lower end of the projection lens barrel L is closely contacted with the upper glass plate of the projection glass portion 207 at a predetermined position, as shown by the two dot and chain line in FIG. 2.

After the roll carrier 200 is shifted from the retard position to the application position in this way, the open-reel (film supply reel) 203 is mounted on the supply shaft 202 of the film supply portion 201, and then a tip end of the film is engaged by the first film guide roller 204, and then the initial loading grip 205 is pushed.

As a result, the first film guide roller 204 is rotated in the film supplying direction to lower the lower glass plate of the projection glass portion 207 thereby to open with respect to the upper glass plate. Further, the film take-up reel 211 of the film take-up portion 210 is rotated in the film take-up direction, with the result that the film is fed out from the open-reel 203 by the first film guide roller 204 and is passed through the gap between the upper and lower glass plates (constituting the projection glass portion 207), the second film guide roller 208 and the film guide 209 to reach the take-up reel 211. Then, a lead film portion (tip end) of the film is wound around the core of the take-up reel 211. In this way, the bridging of the film between the open-reel 203 of the film supply portion 201 and the film take-up reel 211 of the film take-up portion 210 is effected automatically (film initial loading).

After the film initial loading is completed, when an operation knob (not shown) is manipulated in the film supplying direction, the film take-up motor of the film take-up portion 210 is driven to rotate the film take-up reel 211 in the film take-up direction, with the result that the film is supplied from the open-reel 203 to the film take-up reel 211 (normal feeding). On the other hand, when the operation knob is manipulated in the film rewind direction, the film rewind motor of the film supply portion 201 is driven to rotate the open-reel 203 in the film rewind direction, with the result that the film is returned from the film take-up reel 211 to the open-reel 203 (reverse feeding). Speed of the film normal feeding and the film reverse feeding can be adjusted to a high value or a low value by the operation knob.

Regarding the upper and lower glass plates of the projection glass portion 207, during the film normal feeding and the film reverse feeding, the lower glass plate is lowered and opened with respect to the upper glass plate, thereby preventing the sliding friction between the running film and the glass plates. When the film is stopped or when the flow-reading in which the film is running at a low speed, the lower glass plate is lifted to pinch the film between the upper and lower glass plates.

By manipulating the operation knob, the film is fed normally or reversely between the film take-up reel 211 and the open-reel 203 to bring a desired frame on the film to a retrieving position on the projecting light path O corresponding to the projection glass portion 207. By stopping the film at that position, image information in the film frame can be projected on a reader screen (not shown) of the film projecting device with an enlarged scale to permit the inspection of the information. Further, by driving a printer portion, a hard copy regarding the image information can be outputted.

By using the grip 213, when the roll carrier 200 positioned at the application position is shifted toward the rear side, the roll carrier can be returned to the retard position again. While the roll carrier 200 is being returned to the retard position, the projection lens barrel L is slid down from the projection glass portion 207 to return to the initial position where the projection lens barrel is positioned above the aperture portion 102 of the table surface 101.

In the illustrated embodiment, a gravity center of the roll carrier 200 is situated in the vicinity of the guide portion 103 for guiding the roll carrier so that generation of moment is prevented during the shifting movement of the roll carrier effected by the grip 213, thereby achieving smooth shifting movement of the roll carrier in the front-and-rear direction.

That is to say, in the roll carrier 200, the film supply portion 201 remote from the shifting guide portion 103 includes only the film rewind motor and the film take-up portion 210 near the shifting guide portion 103 includes the film take-up motor, the solenoid for driving the lower glass plate of the projection glass portion 207 and the controller PCB for controlling the operation of the carrier. In this way, since major mass of the roll carrier 200 is locally situated in the film take-up portion 210, the gravity center of the roll carrier 200 is positioned in the vicinity of the guide portion 103 (for shifting the roll carrier) of the pedestal portion, with the result that the generation of moment is prevented during the shifting movement of the roll carrier effected by the grip 213, thereby achieving smooth shifting movement of the roll carrier in the front-and-rear direction.

The mounting and the initial loading of the rolled film with respect to the film supply portion 201 of the roll carrier 200 can also be performed in the condition that the roll carrier 200 was shifted to the application position shown in FIG. 2.

Figure 3:
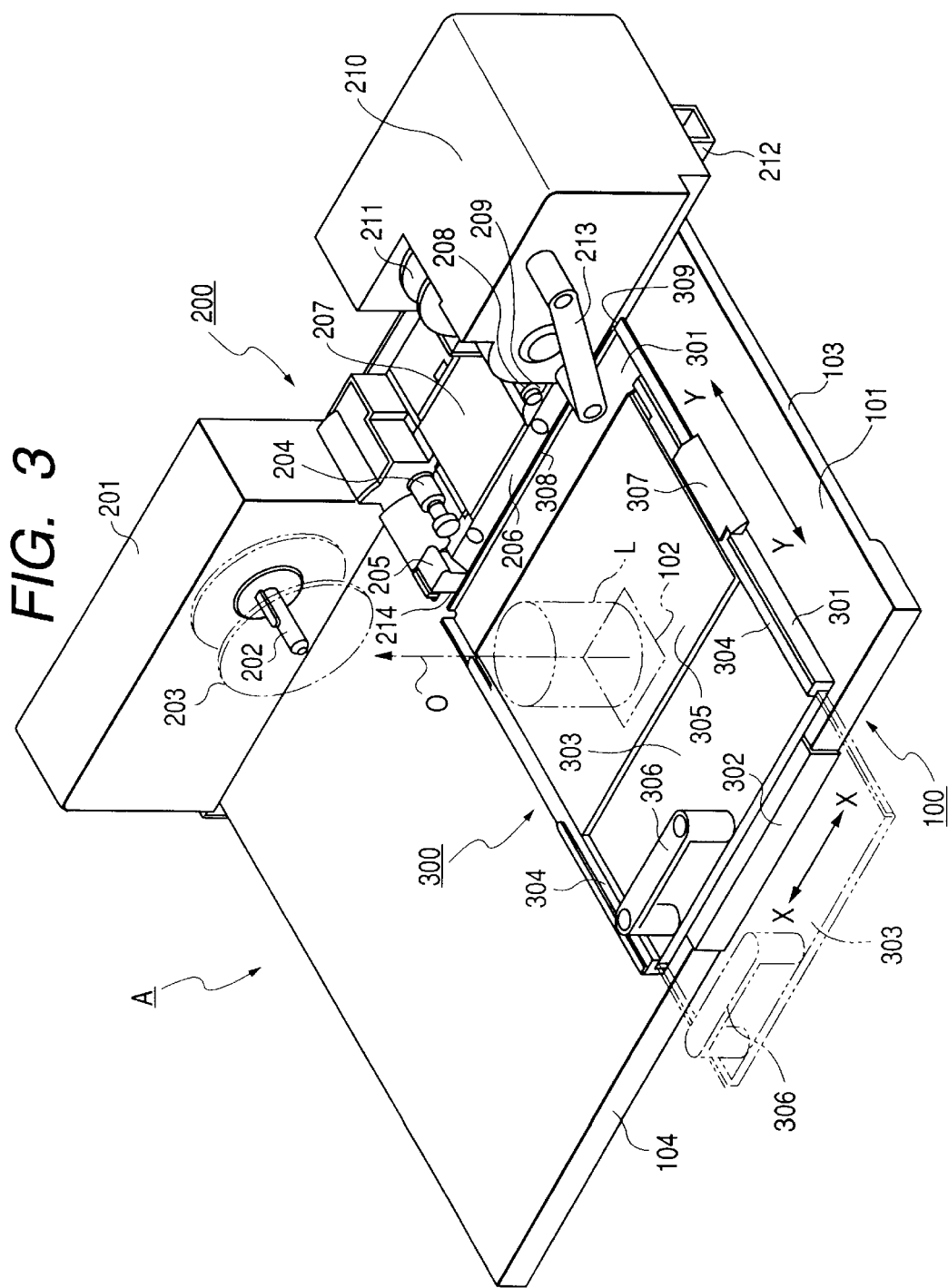
FIG. 3 is a perspective view of the film carrier, showing a condition that the fiche carrier is located at its application position.

3) FIG. 3 shows a condition that the fiche carrier 300 was shifted from the predetermined retard position to the application position.

That is to say, in the condition that both the roll carrier 200 and the fiche carrier 300 are located at the predetermined retard positions as shown in FIG. 1, by using the grip 306 provided on the second frame 303, the fiche carrier 300 is slid on the table surface 101 of the pedestal portion 100 toward the right side.

As a result, the fiche carrier 300 is shifted to the application portion where the projection glass portion 305 is positioned on the film projecting light path O of the film projecting device.

While the fiche carrier 300 is being shifted from the retard position to the application position, the lower end of the projection lens barrel L is guided by the guide portion 307 provided on the right side of the first frame 301 at a central portion thereof, with the result that the lower end of the projection lens barrel L is closely contacted with the upper glass plate of the projection glass portion 305, as shown by the two dot and chain line in FIG. 3.

By using the grip 306, the first frame and accordingly the entire fiche carrier 300 is slid on the table surface 101 of the pedestal portion 100 in the X—X direction by sliding the slider 302 along the front side (guide portion) 104 of the pedestal portion and the second frame 303 is slid on the first frame 301 in the Y—Y direction. As a result, the projection glass portion 305 is two-dimensionally shifted with respect to the projecting light path O to bring the desired frame on the sheet film pinched between the upper and lower glass plates constituting the projection glass portion 305 into the projecting light path O, with the result that the image information in the film frame can be projected on a reader screen (not shown) of the film projecting device with an enlarged scale to permit the inspection of the information. Further, by driving the printer portion, a hard copy regarding the image information can be outputted.

The lower end of the projection lens barrel L is always closely contacted with the upper glass plate of the projection glass portion 305 which is shifted two-dimensionally.

By using the grip 306, when the fiche carrier 300 positioned at the application position is shifted toward the left side, the fiche carrier can be returned to the retard position again. While the fiche carrier 300 is being returned to the retard position, the projection lens barrel L is slid down from the projection glass portion 305 along the film guide portion 307 to return to the initial position where the projection lens barrel is positioned above the aperture portion 102 of the table surface 101.

As explained in connection with the above items 2) and 3), the roll carrier 200 and the fiche carrier 300 can be shifted between their retard positions and application positions independently.

That is to say, the roll carrier 200 and the fiche carrier 300 can be shifted independently in the same plane on the pedestal portion 100, the carrier switching operations for the both carriers can be simplified, thereby preventing mis-operation.

Since the sheet film loaded in the fiche carrier 300 can be used while the rolled film is still loaded in the roll carrier 200 or the rolled film loaded in the roll carrier 200 can be used while the sheet film is still loaded in the fiche carrier 300 to permit the switching between the rolled film and the sheet film, the rolled film and the sheet film can be switched properly, thereby performing the retrieval efficiently.

4) In the film carrier A according to the illustrated embodiment, in the condition that the fiche carrier 300 is located at the predetermined retard position, although the roll carrier 200 can be shifted from the predetermined retard position to the application position (from FIG. 1 to FIG. 2), if the fiche carrier 300 is located at the application position or if the fiche carrier is deviated from the predetermined retard position to exceed the allowable limit, the roll carrier 200 interferes with the abutment portions 308, 309 of the fiche carrier 300 to be prevented from shifting to the application position.

On the other hand, in the condition that the roll carrier 200 is located at the predetermined retard position, although the fiche carrier 300 can be shifted from the predetermined retard position to the application position (from FIG. 1 to FIG. 3), if the roll carrier 200 is located at the application position or if the roll carrier is deviated from the predetermined retard position to exceed the allowable limit, the fiche carrier 300 interferes with the abutment portion 214 of the roll carrier 200 to be prevented from shifting to the application position.

Figure 4:
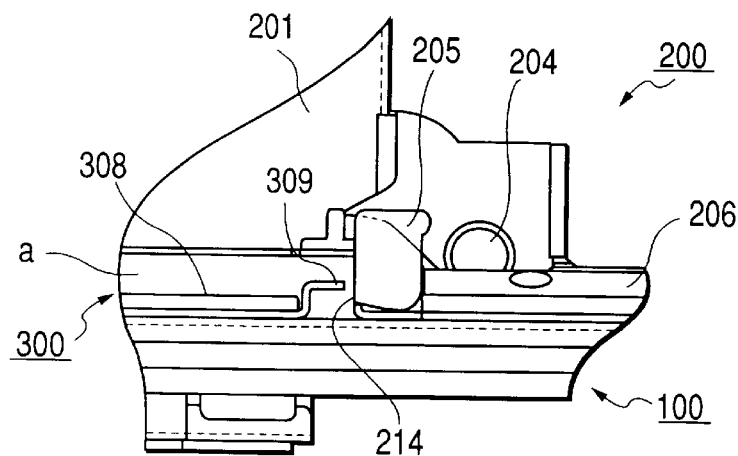
FIG. 4 is a partial front view of the film carrier.

FIG. 4 is a partial front view of the film carrier A, showing a positional relation between the abutment portion 214 of the roll carrier 200 and the abutment portions 308, 309 of the fiche carrier 300 in detail. This relation is established in the condition that both the roll carrier 200 and the fiche carrier 300 are located at their retard positions as shown in FIG. 1.

Figure 5:
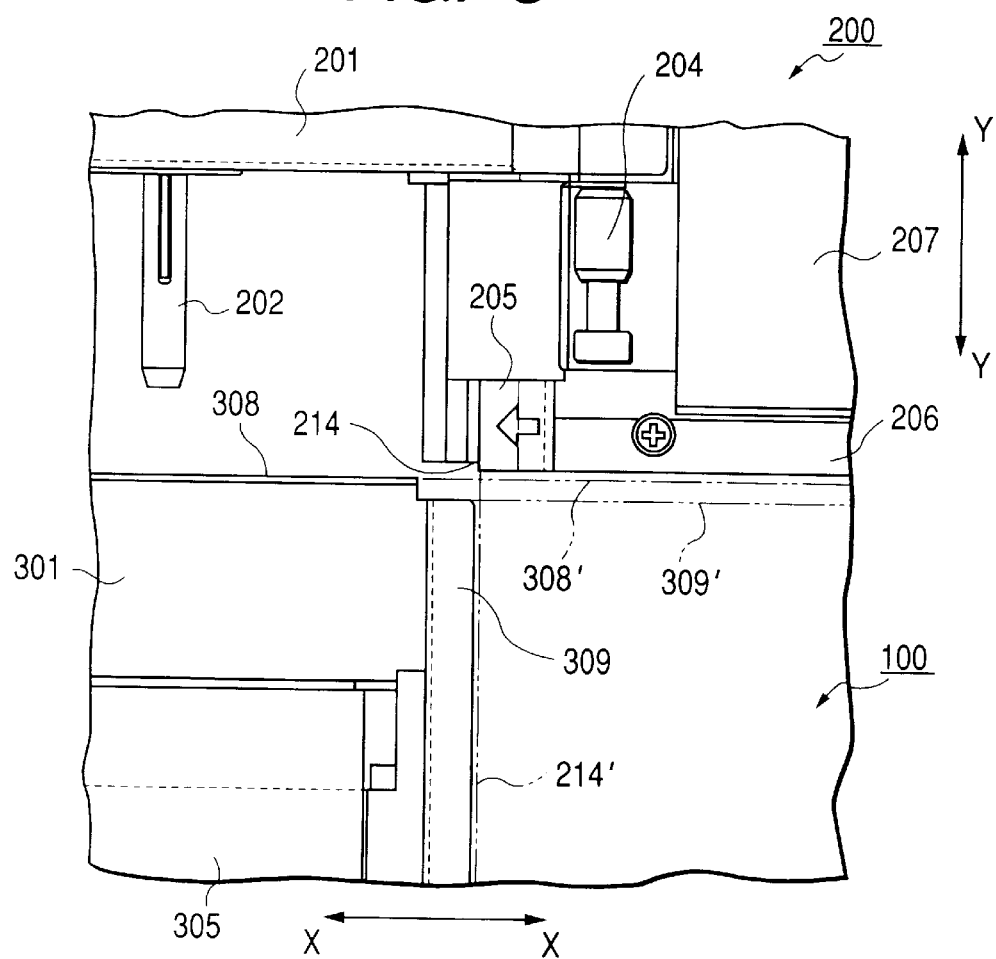
FIG. 5 is a partial plan view of the film carrier.

FIG. 5 is a partial plan view of the film carrier A. In FIG. 5, moving tracks of the abutment portions 308, 309 and the abutment portion 214 are shown by 308', 309' and 214', respectively. More particularly, so long as the position of the roll carrier 200 exceeds the extension line 308' of the abutment portion 308 of the fiche carrier 300, even if the roll carrier 200 is not located at the application position, the fiche carrier 300 cannot be shifted to the application position. Similarly, so long as the fiche carrier 300 exceeds the extension line 214' of the abutment portion 214 of the roll carrier 200, the roll carrier 200 cannot be shifted to the application position.

That is to say, by using the arrangement in which, when one of the roll carrier 200 and the fiche carrier 300 tries to be shifted to its application position, if the other carrier is not located at its predetermined retard position, a part of the members constituting the other carrier prevents one carrier from shifting to its application position, the mis-operation can be avoided without providing any special lock mechanism.

Incidentally, in the film carrier A according to the illustrated embodiment, the rolled film of open-reel type or the rolled film of cartridge type can selectively be mounted on the roll carrier 200. The retrieval of the desired frame in the rolled film may be effected automatically.

As mentioned above, in the illustrated embodiment, regarding the film carrier in which both the rolled film and the sheet film can be used by providing the roll carrier and the fiche carrier, the sheet film can be used while the rolled film is still loaded or the rolled film can be used while the sheet film is still loaded to permit easy switching between the rolled film and the sheet film, thereby improving the operability.

Figure 15:
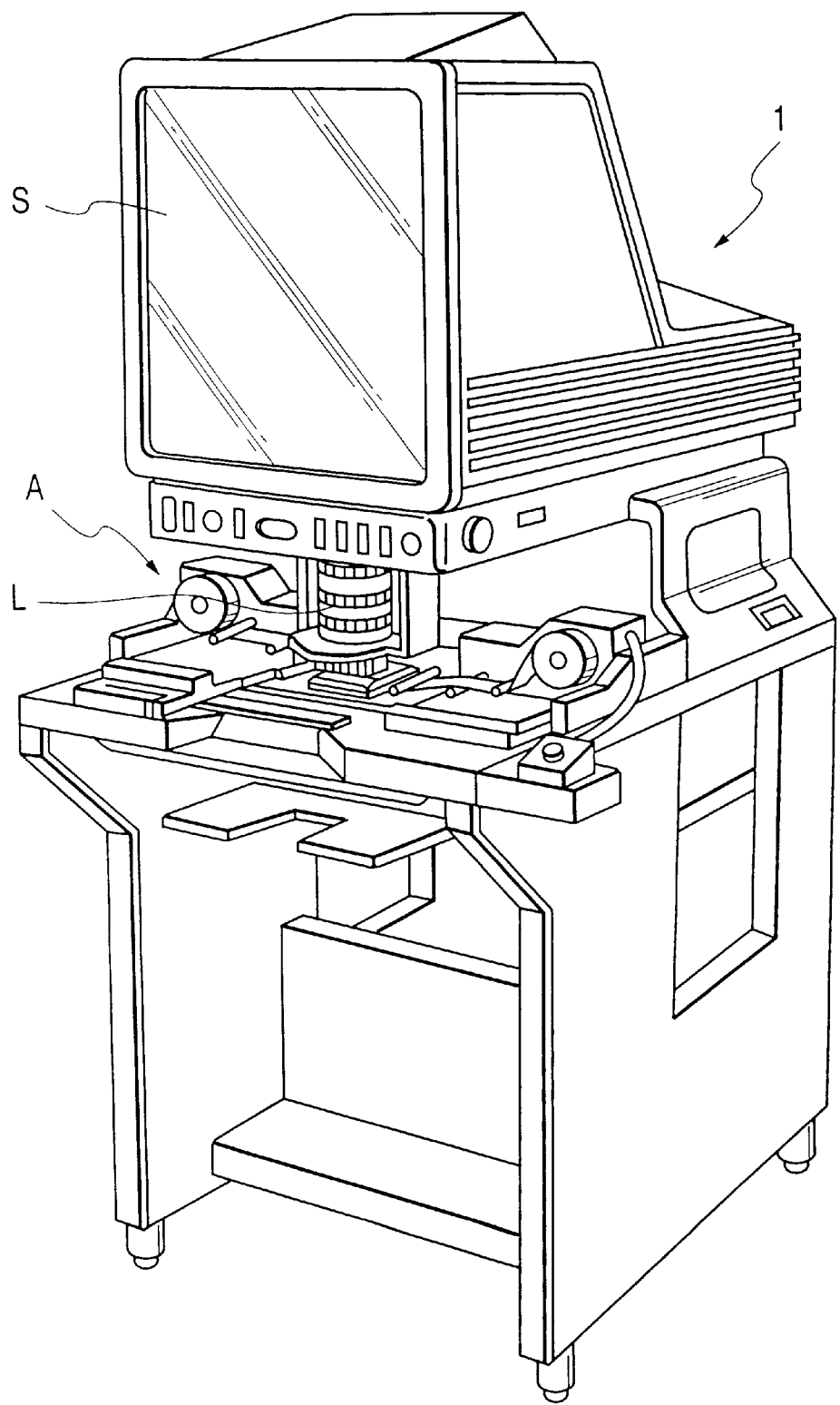
FIG. 15 is a perspective view of a reader printer on which the film carrier is mounted.

FIG. 15 shows a reader printer 1 on which the film carrier A is mounted. In this reader printer, the film carrier A is detachably mounted below the projection lens barrel L of the reader printer.

The printer has a casing within which a group of conventional mirrors for forming the projecting light path and a conventional image forming device are housed. The printer also has a screen S.

FIGS. 6 to 11, show the second embodiment of the present invention. Incidentally, elements having the same function as those in the aforementioned embodiment are designated by the same reference numerals.

Figure 6:
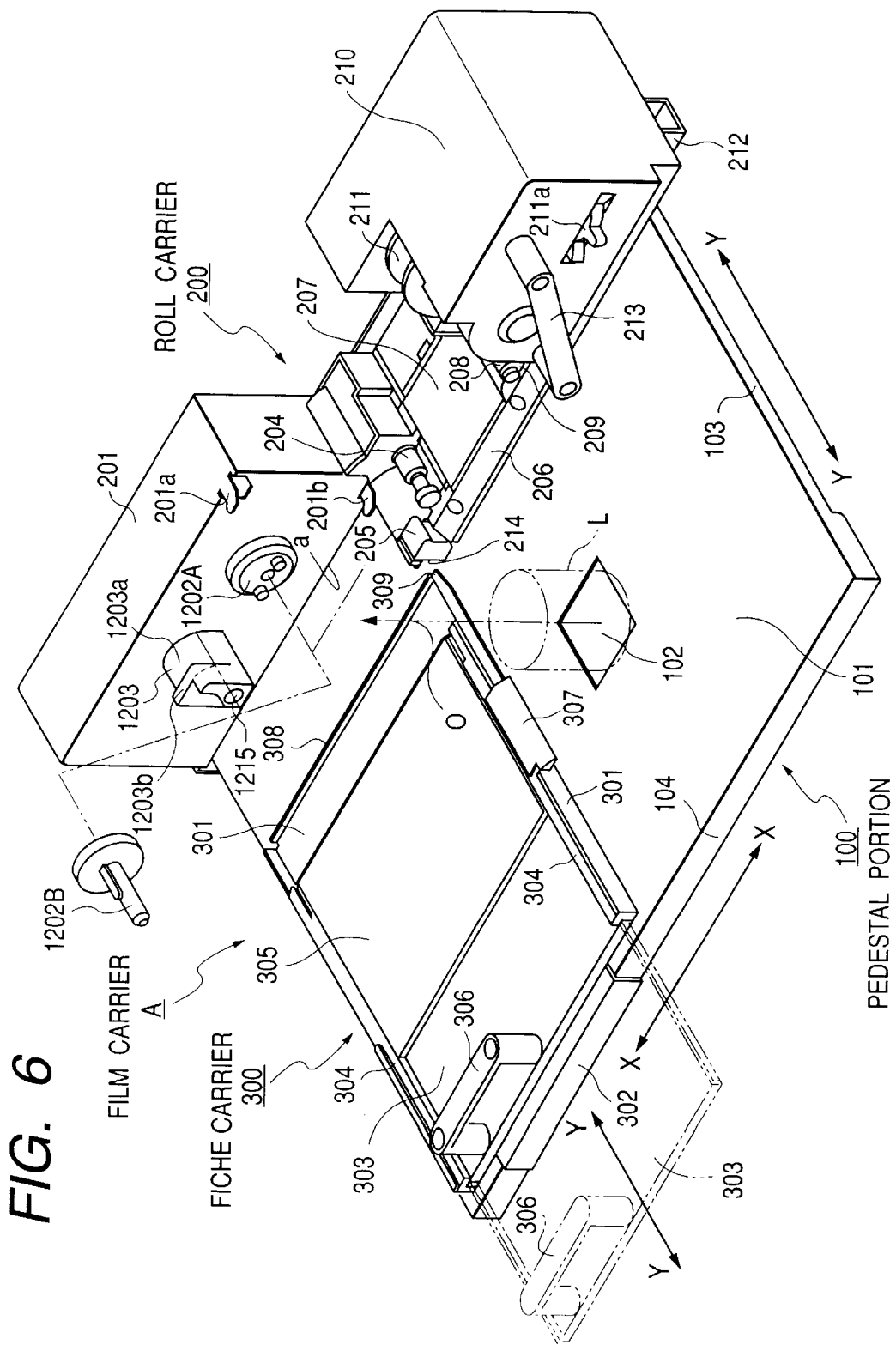
FIG. 6 is a perspective view of a film carrier according to another embodiment of the present invention, showing a condition that both a roll carrier and a fiche carrier are located at their retard positions.

In FIG. 6, a film carrier A comprises a pedestal portion 100, and a roll carrier 200 and a fiche carrier 300 mounted on the pedestal portion 100.

a) Pedestal Portion 100

The pedestal portion 100 is formed from a rectangular plate, and the roll carrier 200 and the fiche carrier 300 are mounted on an upper surface (table surface) 101 of the pedestal portion for shifting movement.

An aperture portion (film illumination portion) 102 is formed in the table surface 101 of the pedestal portion 100 at a predetermined position.

The film carrier A is incorporated into and mounted on a film projecting device (not shown) such as a microfilm reader, a microfilm reader printer or the like by positioning the film carrier with respect to a film carrier mounting portion of the film projecting device and securing the pedestal portion 100 to the film projecting device by means of a securing means.

In a condition that the film carrier A is properly incorporated into the film projecting device, the aperture portion 102 of the table surface 101 of the pedestal portion 100 is aligned with a vertical film projecting path of the film projecting device, and a film illumination means (not shown) of the film projecting device is positioned below the aperture portion 102 and a projection lens barrel L of the film projecting device is positioned above the aperture portion 102.

The projection lens barrel L of the film projecting device is held by a holder (not shown) for vertical movement and is always biased downwardly by its own weight or a relatively weak spring.

The roll carrier 200 can be slid on the table surface 101 of the pedestal portion 100 within a front-and-rear direction distance range defined by front and rear stoppers (not shown) in a Y—Y direction while being guided by a right side 103 of the pedestal portion 100.

The fiche carrier 300 can be slid on the table surface 101 of the pedestal portion 100 within a left-and-right direction distance range defined by left and right stoppers (not shown) in an X—X direction while being guided by a front side 104 of the pedestal portion 100.

b) Roll Carrier 200

In the roll carrier 200, a film supply portion 201 serves to load and hold a rolled film of cartridge type (referred to as "cartridge" hereinafter) or a rolled film of open-reel type (referred to as "open-reel" hereinafter).

A cartridge supply shaft 1202A and an open-reel supply shaft 1202B are detachably (i.e., exchangeably) attached to a front plate portion of a casing of the film supply portion 201. When the cartridge is used, the cartridge supply shaft 1202A is mounted to the front plate portion of the casing of the film supply portion 201, and, when the open-reel is used, the open-reel supply shaft 1202B is mounted to the front plate portion of the casing of the film supply portion 201.

Within the casing (housing) of the film supply portion 201, a film rewind motor for rotatingly driving the supply shaft 1202A or 1202B in a film rewind direction is housed.

A cartridge urging member (cartridge securing member) 1203 is provided on the front plate portion of the casing of the film supply portion 201.

Bent pawl portions 1201a, 1201b are formed on upper and lower sides of the front plate portion of the casing of the film supply portion 201. When the cartridge is mounted, the upper and lower pawl portions are hooked to upper and lower recessed portions provided at a film discharge opening of a front surface of the cartridge.

An encoder (not shown) for detecting a speed of the film is attached to a first film guide roller 204.

A grip 205 is used to load the film initially.

A guide member 206 serves to guide the film and also acts as a guide portion for resting the projection lens barrel L on a projection glass portion 207.

The projection glass portion 207 includes two upper and lower glass plates, and the film guide member 206 also holds these glass plates. The lower glass plate is controlled to shift toward and away from the upper glass plate in accordance with a conveying speed of the film so that, when the film is stopped to inspect the film or when the film is conveyed at a low speed during the flow-reading of the film, the lower glass plate is lifted to pinch the film between the upper and lower glass plates.

A second film guide roller 208 is disposed in an opposed relation to the first film guide roller 204 with the interposition of the projection glass portion 207.

A film take-up portion 210 has a casing within which a film take-up motor for rotatingly driving a film take-up reel 211 in a film take-up direction, a solenoid for shifting the lower glass plate of the projection glass portion 207 in the vertical direction, and a controller PCB for controlling the operation of the film carrier are housed.

A switching lever 211a serves to switch a width of the film take-up reel 211 in accordance with the kind of the rolled film to be used.

A film guide 209 serves to direct the film from the second film guide roller 208 to the take-up reel 211.

A slider 212 integrally formed with a lower surface of the film take-up portion 210 is engaged by the right side 103 of the pedestal portion to be slid along the right side 103. The roll carrier 200 can be slid on the table surface 101 of the pedestal portion 100 within the front-and-rear direction distance range defined by the front and rear stoppers (not shown) in the Y—Y direction while being guided by the slider 212 engaging with the right side 103 of the pedestal portion.

A grip 213 provided on the front plate portion of the casing of the film take-up portion 210 serves to help the shifting movement of the roll carrier 200 in the Y—Y direction.

An abutment portion 214 can abut against the fiche carrier 300.

c) Fiche Carrier 300

In the fiche carrier 300, a slider 302 integrally formed with a front side of a first frame 301 is engaged by the front side 104 of the pedestal portion to slide along the front side 104. The fiche carrier 300 can be slid on the table surface 101 of the pedestal portion 100 within the left-and-right direction distance range defined by the left and right stoppers (not shown) in the X—X direction while being guided by the slider 302 engaging with the front side 104 of the pedestal portion 100.

A second frame 303 is provided on the first frame 301. Left and right sides of the second frame are engaged by front and rear guide portions 304 of the first frame 301 so that the second frame can be slid on the first frame 301 within a front-and-rear direction distance range defined by front and rear stoppers (not shown) in the Y—Y direction.

The second frame 303 is provided with a projection glass portion 305 which is constituted by upper and lower glass plates between which a sheet film is pinched and held.

The second frame 303 is further provided with a grip 306. By using the grip 306, the first frame 301 and accordingly the entire fiche carrier 300 can be slid on the table surface 101 of the pedestal portion 100 in the X—X direction while being guided by sliding the slider 302 on the front side 104 of the pedestal portion. Further, by using the grip 306, the second frame 303 can be slid on the first frame 301 in the Y—Y direction.

Although not shown in detail, in FIG. 6, by drawing and sliding the second frame 303 on the first frame 301 toward a front side in the Y—Y direction until it abuts against the front stopper, as shown by the two dot and chain line, the upper glass plate (of the two plates constituting the projection glass portion 305) is rotated and opened with respect to the lower glass plate. In a condition that the upper glass plate is rotated and opened, the sheet film is rested on the lower glass plate. Then, when the second frame 303 is slid on the first frame 301 toward a rear side in the Y—Y direction, the upper glass plate is rotated and closed with respect to the lower glass plate, thereby pinching and holding the sheet film between the upper and lower glass plates.

A guide portion 307 disposed on the right side of the first frame 301 at a central portion thereof serves to rest the projection lens barrel L on the projection glass portion 305.

The first frame 301 is provided with abutment portions 308, 309 which can abut against the roll carrier 200.

d) Carrier Switching

1) FIG. 6 shows a condition that both the roll carrier 200 and the fiche carrier 300 are positioned at predetermined "retard positions" spaced apart from "application positions" where the projection glass portion 207 or 305 is disposed on a film projecting light path O of the film projecting device.

In the illustrated embodiment, the predetermined retard position of the roll carrier 200 is a rear side position on the table surface 101 of the pedestal portion 100 in the Y—Y direction, as shown. In this retard position, the roll carrier 200 abuts against the rear stopper (not shown) not to further shift toward the rear side.

The retard position of the fiche carrier 300 is a left side position on the table surface 101 of the pedestal portion 100 in the X—X direction, as shown. In this retard position, the fiche carrier 300 abuts against the left stopper (not shown) not to further shift toward the left side.

2) FIG. 7 shows a condition that the roll carrier 200 was shifted from the predetermined retard position shown in FIG. 6 to the application position, and the cartridge (rolled film of cartridge type) 400 is mounted on the front plate portion of the film supply portion 201.

That is to say, in the condition that both the roll carrier 200 and the fiche carrier 300 are located at the predetermined retard positions as shown in FIG. 6, by using the grip 213 provided on the front plate portion of the film take-up portion 210, the roll carrier 200 is slid on the table surface 101 of the pedestal portion 100 toward the front side until the roll carrier abuts against the front stopper (not shown). As a result, the roll carrier 200 is shifted to the application portion where the projection glass portion 207 is positioned on the film projecting light path O of the film projecting device.

In this case, the bottom of the film supply portion 201 of the roll carrier 200 is floating from the table surface 101 of the pedestal portion 100 to form a gap a (between the film supply portion and the table surface 101 of the pedestal portion 100) through which the fiche carrier 300 can be shifted, so that, when the roll carrier 200 is shifted toward the front side in the Y—Y direction, so long as the fiche carrier 300 is located at the predetermined retard position, the film supply portion 201 of the roll carrier 200 can be slid over the fiche carrier 300 without interference.

While the roll carrier 200 is being shifted from the retard position to the application position, the lower end of the projection lens barrel L is guided by the film guide portion 206 to ride on the upper glass plate of the projection glass portion 207. In a condition that the roll carrier 200 was shifted to the predetermined application position, the lower end of the projection lens barrel L is closely contacted with the upper glass plate of the projection glass portion 207 at a predetermined position, as shown by the two dot and chain line in FIG. 7.

The cartridge 400 is mounted on the film supply portion 201 of the roll carrier 200 in the following manner.

That is to say, the roll carrier 200 is shifted from the retard position to the application position (from FIG. 6 to FIG. 7) to position the film supply portion 201 of the roll carrier 200 on the projection glass portion 305 of the fiche carrier 300. Then, the cartridge supply shaft 1202A is mounted on the film supply portion 201. At the front side of the film supply portion 201, the cartridge 400 is rested on the glass upper surface of the projection glass portion 305. Then, the rested cartridge 400 is slid on the glass upper surface of the projection glass portion 305 to be shifted with respect to the film supply portion 201 until a bearing portion of the cartridge 400 is fitted on the cartridge supply shaft 1202A of the film supply portion 201 and the upper and lower recessed portions 400a, 400b provided at the film discharge opening of the cartridge 400 are hooked on the upper and lower bent pawl portions 1201a, 1201b provided on the front plate portion of the casing of the film supply portion 201. Then, the cartridge urging member 1203 is rotated to secure the cartridge 400, thereby completing the mounting of the cartridge 400 with respect to the film supply portion 201.

Figure 8A:
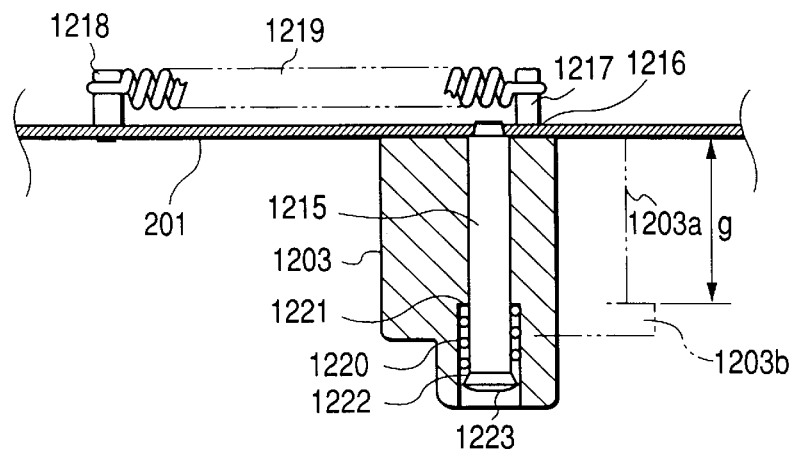
FIGS. 8A and 8B are explanatory views showing a cartridge urging member.
Figure 8B:
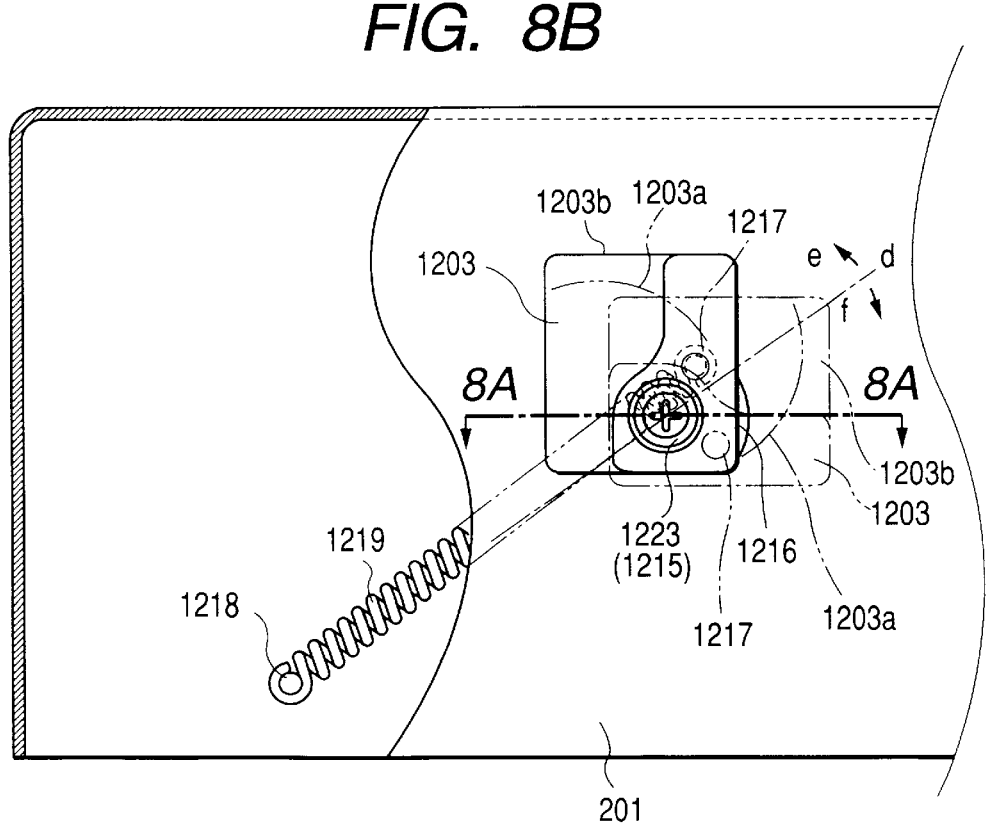

FIGS. 8A and 8B show the cartridge urging member 1203. The urging member 1203 is provided with a cam surface portion 1203a and a flange seat portion 1203b. The cartridge urging member 1203 is supported on a shaft 1215 protruded forwardly from the front plate portion of the casing of the film supply portion 201 for rotational movement around the shaft 1215 within a predetermined range and for sliding movement along the shaft 1215 within a predetermined range.

The rotational range of the urging member 1203 around the shaft 1215 is regulated to about 90 degrees between a first angular posture (cocked condition) shown by the solid line in FIG. 8B and a second angular posture (laid condition) shown by the two dot and chain line, by an arcuate slit 1216 formed in the front plate portion of the casing of the film supply portion 201 and a pin 1217 of the urging member 1203 fitted into the slit.

At a back side of the front plate portion of the casing of the film supply portion 201, a coil spring 1219 is disposed between a fixed pin 1218 formed on a back surface of the front plate portion of the casing and the pin 1217 of the urging member 1203. Regarding a line (dead point) connecting between the shaft 1215 and the fixed pin 1218, when the pin 1217 of the urging member 1203 is situated at a side e, the urging member 1203 is rotatingly biased toward an anti-clockwise direction around the shaft 1215 by a pulling force of the coil spring 1219 to be held to the first angular posture (cocked condition). On the other hand, when the pin 1217 of the urging member 1203 is situated at a side f, the urging member 1203 is rotatingly biased toward a clockwise direction around the shaft 1215 by the pulling force of the coil spring 1219 to be held to the second angular posture (laid condition).

Further, the urging member 1203 can freely be shifted along the shaft 1215 within the predetermined range so that the urging member is always biased to be urged against the front plate portion of the casing of the film supply portion 201 by a pressure spring 1220. The reference numerals 1221, 1222 denote washers provided on both ends of the pressure spring 1220; and 1223 denotes a screw for pushing the pressure spring 1220 via the washer 1222.

Before the cartridge is mounted, the urging member 1203 is maintained to the first angular posture (cocked condition). After the bearing portion of the cartridge 400 is fitted on the cartridge supply shaft 1202A of the film supply portion 201 and the upper and lower recessed portions 400a, 400b provided at the film discharge opening of the cartridge 400 are hooked on the upper and lower bent pawl portions 1201a, 1201b provided on the front plate portion of the casing of the film supply portion 201, the urging member 1203 is switched to the second angular posture (laid condition).

Consequently, the rear wall of the cartridge 400 is pushed by the cam surface portion 1203a of the urging member 1203, with the result that the cartridge 400 is firmly pinched between the pawl portions 1201a, 1201b and the cam surface portion 1203a of the urging member 1203. By engaging the flange seat portion 1203b of the urging member 1203 with an outer surface of the rear end of the cartridge 400, the cartridge 400 is urged against the front plate portion of the casing of the film supply portion 201 by the thrust shifting force of the urging member 1203 given by the pressure spring 1220.

In this way, the cartridge 400 is firmly mounted on and secured to the film supply portion 201. That is to say, by holding the cartridge 400 to the film supply portion 201 by using the cartridge urging member 1203 for hooking the upper and lower recessed portions 400a, 400b provided at the film discharge opening on the upper and the lower bent pawl portions 1201a, 1201b provided on the film supply portion 201 and for urging the cartridge in a direction perpendicular to the film conveying direction while urging the cartridge surface (cartridge rear wall) opposite to the film discharge opening toward the pawl portions, the cartridge can be held without any play by using a simple mechanism.

By setting a distance g (FIG. 8A) between the inner surface of the flange seat portion 1203b of the urging member 1203 and the outer surface of the front plate portion of the casing of the film supply portion 201 to become smaller than a width (thickness) of the cartridge 400, when the cartridge 400 is set, the cartridge 400 is urged against the front plate portion of the casing of the film supply portion 201.

As mentioned above, since the glass upper surface of the projection glass portion 305 of the fiche carrier 300 is utilized as the guide surface when the cartridge 400 is mounted on the film supply portion 201 of the roll carrier 200, the cartridge can be set positively without providing any special guide surface required for setting the cartridge.

After the cartridge 400 is set on the film supply portion 201 of the roll carrier 200 in this way, the tip end of the film is engaged by the first film guide roller 204, and then, the initial loading grip 205 is pushed. As a result, the first film guide roller 204 is rotated in the film supplying direction to lower the lower glass plate of the projection glass portion 207 thereby to open with respect to the upper glass plate. Further, the film take-up reel 211 of the film take-up portion 210 is rotated in the film take-up direction, with the result that the film on the supply reel in the cartridge 400 is fed out by the first film guide roller 204 and is passed through the gap between the upper and lower glass plates (constituting the projection glass portion 207), the second film guide roller 208 and the film guide 209 to reach the take-up reel 211. Then, a lead film portion (tip end) of the film is wound around the core of the take-up reel 211. In this way, the bridging of the film between the supply reel in the cartridge 400 set in the film supply portion 201 and the film take-up reel 211 of the film take-up portion 210 is effected automatically (film initial loading).

After the film initial loading is completed, when an operation knob (not shown) is manipulated in the film supplying direction, the film take-up motor of the film take-up portion 210 is driven to rotate the film take-up reel 211 in the film take-up direction, with the result that the film is supplied from the supply reel in the cartridge 400 to the film take-up reel 211 (normal feeding). On the other hand, when the operation knob is manipulated in the film rewind direction, the film rewind motor of the film supply portion 201 is driven to rotate the supply reel in the cartridge 400 in the film rewind direction, with the result that the film is returned from the film take-up reel 211 to the supply reel in the cartridge 400 (reverse feeding). Speed of the film normal feeding and the film reverse feeding can be adjusted to a high value or a low value by the operation knob.

Regarding the upper and lower glass plates of the projection glass portion 207, during the film normal feeding and the film reverse feeding, the lower glass plate is lowered and opened with respect to the upper glass plate, thereby preventing the sliding friction between the running film and the glass plates. When the film is stopped or when the flow-reading in which the film is running at a low speed, the lower glass plate is lifted to pinch the film between the upper and lower glass plates.

By manipulating the operation knob, the film is fed normally or reversely between the film take-up reel 211 and the supply reel in the cartridge 400 to bring a desired frame on the film to a retrieving position on the projecting light path O corresponding to the projection glass portion 207. By stopping the film at that position, image information in the film frame can be projected on a reader screen (not shown) of the film projecting device with an enlarged scale to permit the inspection of the information. Further, by driving a printer portion, a hard copy regarding the image information can be outputted.

By using the grip 213, when the roll carrier 200 positioned at the application position is shifted toward the rear side, the roll carrier can be returned to the retard position again. While the roll carrier 200 is being returned to the retard position, the projection lens barrel L is slid down from the projection glass portion 207 through the film guide portion 206 to return to the initial position where the projection lens barrel is positioned above the aperture portion 102 of the table surface 101.

In the illustrated embodiment, a gravity center of the roll carrier 200 is situated in the vicinity of the guide portion 103 for guiding the roll carrier so that generation of moment is prevented during the shifting movement of the roll carrier effected by the grip 213, thereby achieving smooth shifting movement of the roll carrier in the front-and-rear direction.

That is to say, in the roll carrier 200, the film supply portion 201 remote from the shifting guide portion 103 includes only the film rewind motor and the film take-up portion 210 near the shifting guide portion 103 includes the film take-up motor, the solenoid for driving the lower glass plate of the projection glass portion 207 and the controller PCB for controlling the operation of the carrier. In this way, since major mass of the roll carrier 200 is locally situated in the film take-up portion 210, the gravity center of the roll carrier 200 is positioned in the vicinity of the guide portion 103 (for shifting the roll carrier) of the pedestal portion, with the result that the generation of moment is prevented during the shifting movement of the roll carrier effected by the grip 213, thereby achieving smooth shifting movement of the roll carrier in the front-and-rear direction.

The dismounting of the cartridge 400 set on the roll carrier 200 is achieved by switching the urging member to the first angular posture (cocked condition) to release the securing of the cartridge 400 and by releasing the engagement of the cartridge supply shaft 1202A and the engagement of the bent pawl portions 1201a, 1201b. Since the dismounting of the cartridge 400 can be effected in the condition that the roll carrier 200 is located at the application position, the lower surface of the dismounted cartridge 400 is received on the glass upper surface of the projection glass portion 305 of the fiche carrier 300. Thus, since the glass upper surface of the projection glass portion 305 acts as the guide surface for the dismounting of the cartridge, the operability is improved.

3) FIG. 9 shows a condition that the fiche carrier 300 was shifted from the predetermined retard position to the application position.

That is to say, in the condition that both the roll carrier 200 and the fiche carrier 300 are located at the predetermined retard positions as shown in FIG. 6, by using the grip 306 provided on the second frame 303, the fiche carrier 300 is slid on the table surface 101 of the pedestal portion 100 toward the right side.

As a result, the fiche carrier 300 is shifted to the application portion where the projection glass portion 305 is positioned on the film projecting light path O of the film projecting device.

While the fiche carrier 300 is being shifted from the retard position to the application position, the lower end of the projection lens barrel L is guided by the guide portion 307 provided on the right side of the first frame 301 at a central portion thereof, with the result that the lower end of the projection lens barrel L is closely contacted with the upper glass plate of the projection glass portion 305, as shown by the two dot and chain line in FIGS. 8A and 8B.

By using the grip 306, the first frame 301 and accordingly the entire fiche carrier 300 is slid on the table surface 101 of the pedestal portion 100 in the X—X direction by sliding the slider 302 along the front side (guide portion) 104 of the pedestal portion and the second frame 303 is slid on the first frame 301 in the Y—Y direction. As a result, the projection glass portion 305 is two-dimensionally shifted with respect to the projecting light path O to bring the desired frame on the sheet film pinched between the upper and lower glass plates constituting the projection glass portion 305 into the projecting light path O, with the result that the image information in the film frame can be projected on a reader screen (not shown) of the film projecting device with an enlarged scale to permit the inspection of the information.

Further, by driving the printer portion, a hard copy regarding the image information can be outputted.

The lower end of the projection lens barrel L is always closely contacted with the upper glass plate of the projection glass portion 305 which is shifted two-dimensionally.

By using the grip 306, when the fiche carrier 300 positioned at the application position is shifted toward the left side, the fiche carrier can be returned to the retard position again. While the fiche carrier 300 is being returned to the retard position, the projection lens barrel L is slid down from the projection glass portion 305 along the film guide portion 307 to return to the initial position where the projection lens barrel is positioned above the aperture portion 102 of the table surface 101 of the pedestal portion.

As explained in connection with the above items 2) and 3), the roll carrier 200 and the fiche carrier 300 can be shifted between their retard positions and application positions independently.

That is to say, since the roll carrier 200 and the fiche carrier 300 can be shifted independently in the same plane on the pedestal portion 100, the carrier switching operations for the both carriers can be simplified, thereby preventing mis-operation.

Since the sheet film loaded in the fiche carrier 300 can be used while the rolled film (cartridge or open-reel) is still loaded in the roll carrier 200 or the rolled film loaded in the roll carrier 200 can be used while the sheet film is still loaded in the fiche carrier 300 to permit the switching between the rolled film and the sheet film, the rolled film and the sheet film can be switched properly, thereby performing the retrieval efficiently.

4) In the film carrier A according to the illustrated embodiment, in the condition that the fiche carrier 300 is located at the predetermined retard position, although the roll carrier 200 can be shifted from the predetermined retard position to the application position (from FIG. 6 to FIG. 7), if the fiche carrier 300 is located at the application position or if the fiche carrier is deviated from the predetermined retard position to exceed the allowable limit, the roll carrier 200 interferes with the abutment portions 308, 309 of the fiche carrier 300 to be prevented from shifting to the application position.

On the other hand, in the condition that the roll carrier 200 is located at the predetermined retard position, although the fiche carrier 300 can be shifted from the predetermined retard position to the application position (from FIG. 6 to FIG. 9), if the roll carrier 200 is located at the application position or if the roll carrier is deviated from the predetermined retard position to exceed the allowable limit, the fiche carrier 300 interferes with the abutment portion 214 of the roll carrier 200 to be prevented from shifting to the application position.

Figure 10:
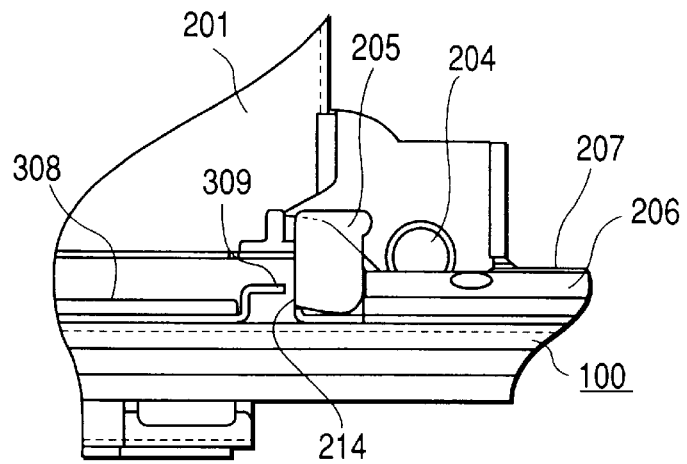
FIG. 10 is a partial front view of the film carrier.

FIG. 10 is a partial front view of the film carrier A, showing a positional relation between the abutment portion 214 of the roll carrier 200 and the abutment portions 308, 309 of the fiche carrier 300 in detail. This relation is established in the condition that both the roll carrier 200 and the fiche carrier 300 are located at their retard positions as shown in FIG. 6.

Figure 11:
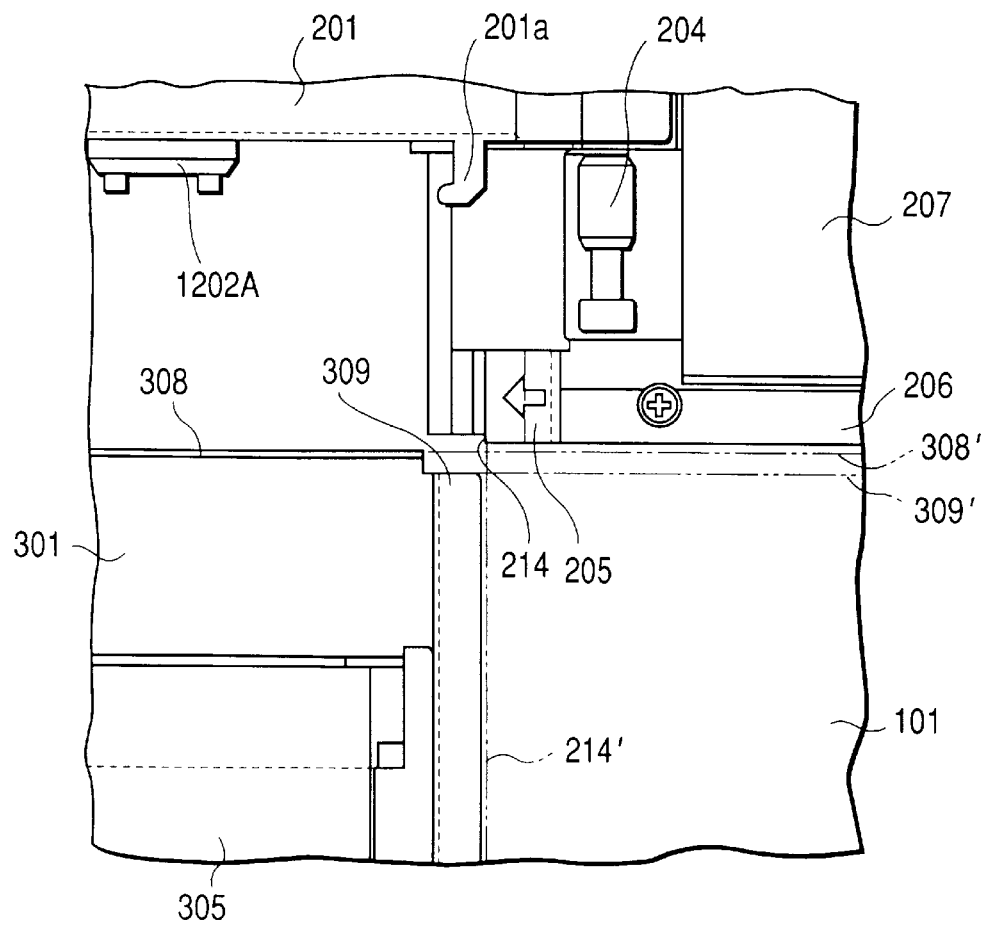
FIG. 11 is a partial plan view of the film carrier.

FIG. 11 is a partial plan view of the film carrier A. In FIG. 11, moving tracks of the abutment portions 308, 309 and the abutment portion 214 are shown by 308', 309' and 214', respectively. More particularly, so long as the position of the roll carrier 200 exceeds the extension line 308' of the abutment portion 308 of the fiche carrier 300, even if the roll carrier 200 is not located at the application position, the fiche carrier 300 cannot be shifted to the application position.

Similarly, so long as the fiche carrier 300 exceeds the extension line 214' of the abutment portion 214 of the roll carrier 200, the roll carrier 200 cannot be shifted to the application position.

That is to say, by using the arrangement in which, when one of the roll carrier 200 and the fiche carrier 300 tries to be shifted to its application position, if the other carrier is not located at its predetermined retard position, a part of the members constituting the other carrier prevents one carrier from shifting to its application position, the mis-operation can be avoided without providing any special lock mechanism.

Figure 12:
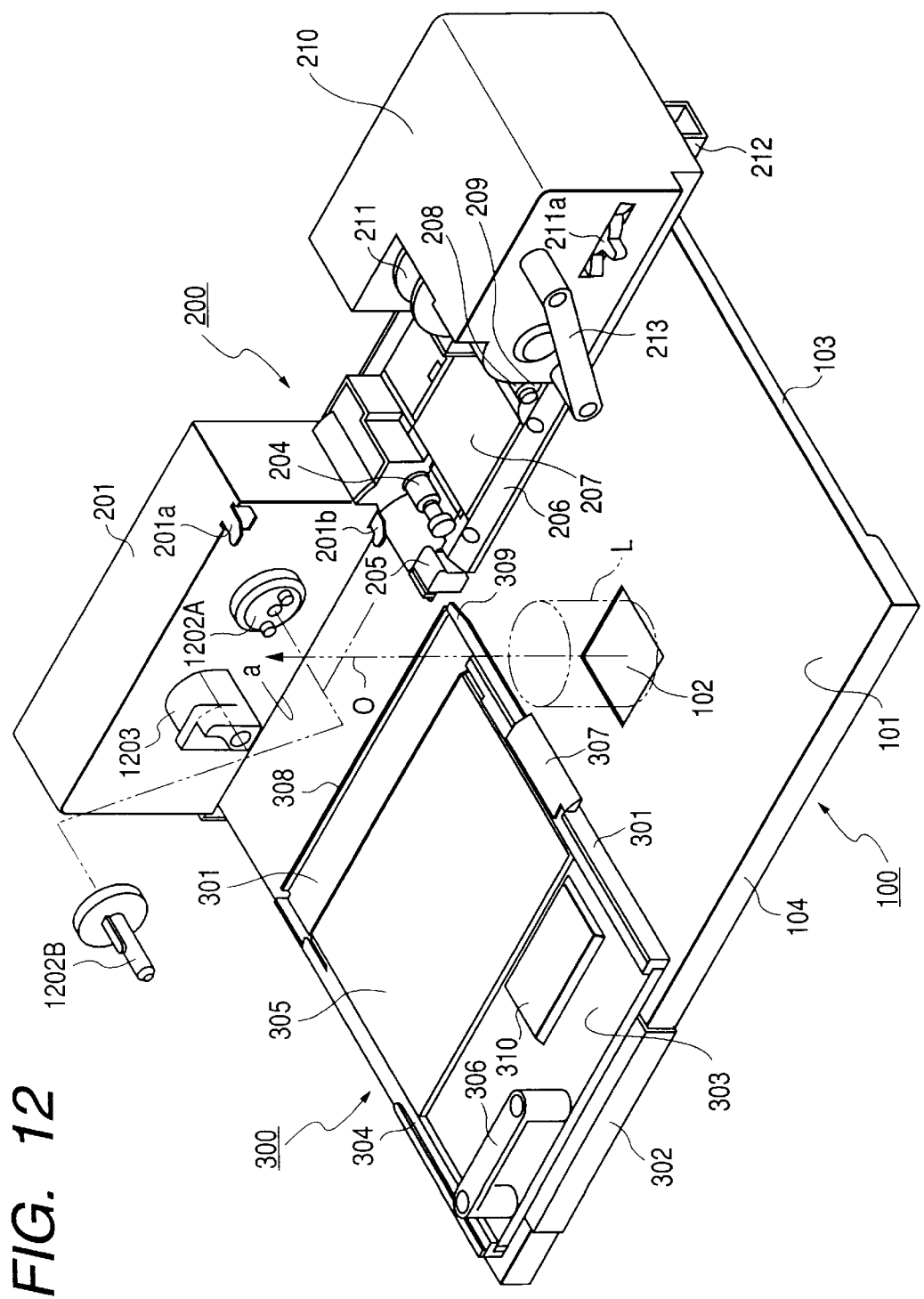
FIG. 12 is a perspective view of a film carrier according to a further embodiment of the present invention, showing a condition that both a roll carrier and a fiche carrier are located at their retard positions.
Figure 13:
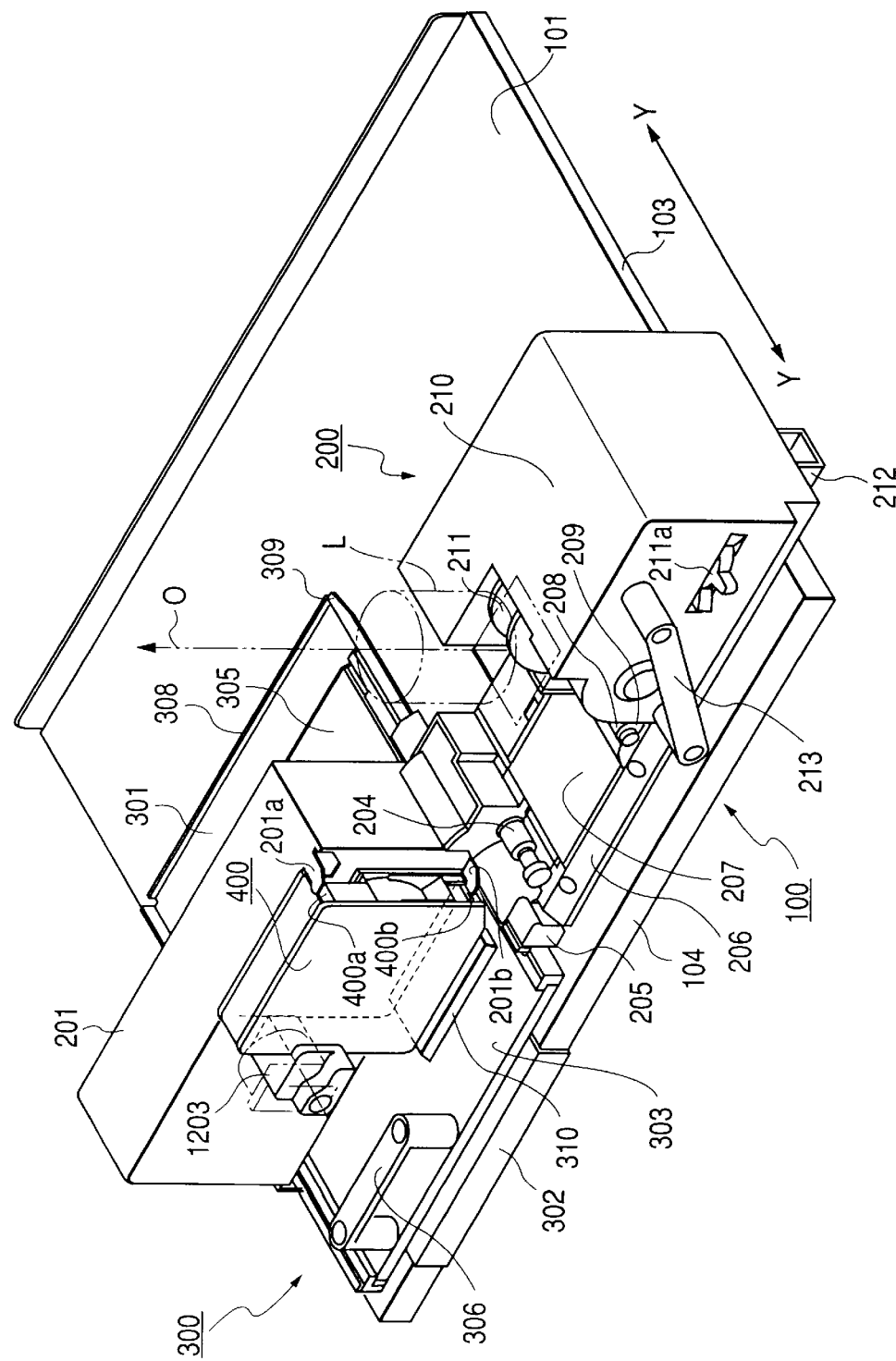
FIG. 13 is a perspective view of the film carrier of FIG. 12, showing a condition that the roll carrier is located at a preparation position.
Figure 14:
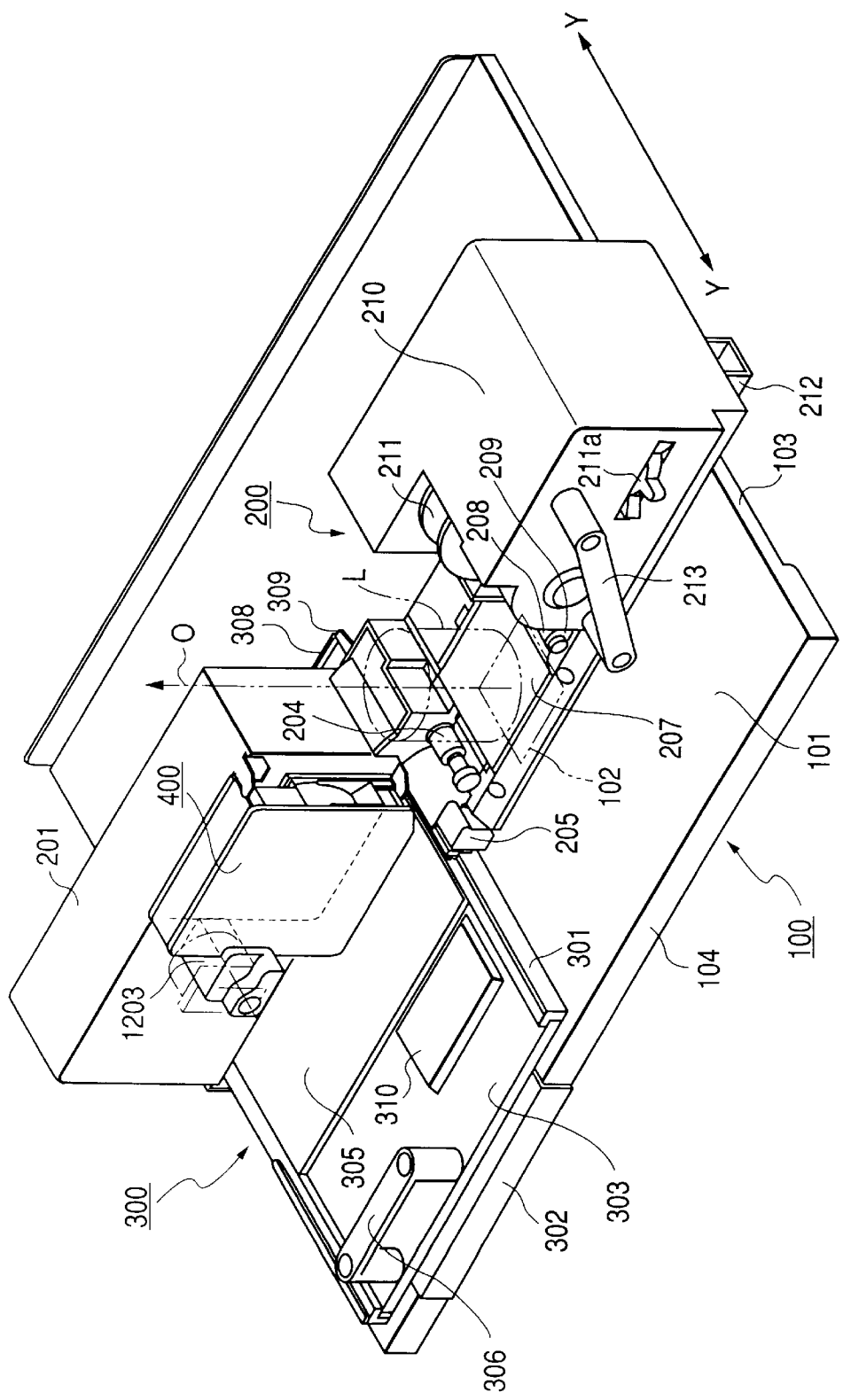
FIG. 14 is a perspective view of the film carrier of FIG. 12, showing a condition that the fiche carrier is located at its application position.

<Third Embodiment>
(FIGS. 12 to 14)

In a further embodiment of the present invention, the second frame 303 of the fiche carrier 300 is provided with a guide portion 310 for receiving the lower surface of the cartridge 400 at a more front side than the projection glass portion 305. The guide portion 310 is disposed substantially flush with the glass upper surface of the projection glass portion 305. Since the other constructions are the same as those in the preferred embodiment, explanation thereof will be omitted.

In this embodiment, the cartridge 400 is mounted on the film supply portion 201 of the roll carrier 200 in the following manner.

That is to say, as shown in FIG. 12, in the condition that both the roll carrier 200 and the fiche carrier 300 are located at their predetermined "retard positions" spaced apart from the "application positions" where the projection glass portion 207 or 305 is positioned on the film projecting light path O of the film projecting device, the roll carrier 200 is shifted from the retard position, through the application position, to a predetermined "preparation position" at a further front side.

When the roll carrier 200 is shifted to the preparation position, the film supply portion 201 of the roll carrier 200 passes through the projection glass portion 305 of the fiche carrier 300 to reach the guide portion 310 at a more front side than the projection glass portion 305.

In this condition the lower surface of the cartridge 400 is rested on the guide portion 310. Then, the rested cartridge 400 is slid on the guide portion 310 to be shifted with respect to the film supply portion 201 until the bearing portion of the cartridge 400 is fitted on the cartridge supply shaft 1202A of the film supply portion 201 and the upper and lower recessed portions 400a, 400b provided at the film discharge opening of the cartridge 400 are hooked on the upper and lower bent pawl portions 1201a, 1201b provided on the front plate portion of the casing of the film supply portion 201, as is in the preferred embodiment. Then, the cartridge urging member 1203 is rotated to secure the cartridge 400, thereby completing the mounting of the cartridge 400 with respect to the film supply portion 201.

Then, the roll carrier 200 is shifted (retarded) from the preparation position shown in FIG. 13 to the application position shown in FIG. 14.

In this embodiment, since the cartridge can be set in the condition that the roll carrier 200 is drawn toward the front side of the film projecting device more than in the preferred embodiment, the operability is further improved.

The initial loading of the cartridge 400 set on the film supply portion 201 of the roll carrier 200 can be effected in the condition that the roll carrier 200 is located at the preparation position or after the roll carrier 200 was retarded to the application position.

When the dismounting of the cartridge 400 set on the roll carrier 200 is effected in the condition that the roll carrier 200 is located at the preparation position shown in FIG. 13, the operability can be improved, similar to the setting of the cartridge.

As is in the film carrier according to the first embodiment, in the film carrier A according to the third embodiment, the upper surface of the projection glass portion 305 of the fiche carrier 300 can also act as the guide surface of guiding the mounting/dismounting of the cartridge.

Incidentally, in the film carriers A according to second and third embodiments, the retrieval of the desired frame on the rolled film can be effected automatically. Further, when the open-reel supply shaft 1202B is mounted on the film supply portion 201 of the roll carrier 200, the roll carrier of open-reel type can be used.

As mentioned above, according to the present invention, regarding the film carrier in which both the rolled film and the sheet film can be used by providing the roll carrier and the fiche carrier, the sheet film can be used while the rolled film is still loaded or the rolled film can be used while the sheet film is still loaded, and the roll film of open-reel type or the roll film of cartridge type can selectively be used, and the mounting and dismounting of the roll film of cartridge type with respect to the film supply portion of the roll carrier can be effected easily and correctly, thereby permitting easy switching between the rolled film and the sheet film and improving the operability.

What is claimed is:

1. A film carrier which is mounted on a film projecting device and in which both of a rolled film and a sheet film can be used, the film carrier comprising:

a film conveying mechanism for holding the rolled film and for supplying and returning the rolled film between a supply reel and a take-up reel;

a roll carrier having a pair of transparent plates defining a film convey path therebetween and shiftable in a transverse direction perpendicular to a film conveying direction;

a fiche carrier for holding a sheet film between a pair of transparent plates and shiftable in the film conveying direction, and the transverse direction; and a pedestal portion including guide portions for shifting said roll carrier and said fiche carrier horizontally in the same plane between respective predetermined retard positions and respective application positions.

2. A film carrier according to claim 1, wherein, when one of said roll carrier and said fiche carrier tries to be shifted from the predetermined retard position to the application position thereof, respectively, if the other carrier is not located at the predetermined retard position thereof, a part of members of the other carrier prevents the one carrier from shifting to the application position.

3. A film carrier according to claim 1 or 2, wherein a gravity center of said roll carrier is located in the vicinity of said guide member for shifting said roll carrier.

4. A film carrier according to claim 1, wherein a gap capable of containing said fiche carrier is formed between said pedestal portion and a bottom surface of said roll carrier.

5. A film carrier according to claim 1, wherein said guide portions form a side surface of said pedestal.

6. A film carrier which is mounted on a film projecting device and in which both a rolled film and a sheet film can be used, the film carrier comprising:

a film conveying mechanism for holding a rolled film of open-reel type or a rolled film contained in a cartridge at a film supply portion and for supplying and returning the rolled film between said film supply portion and a take-up reel;

a roll carrier having a pair of transparent plates defining a film convey path therebetween and shiftable in a transverse direction perpendicular to a film conveying direction;

a fiche carrier for holding a sheet film between a pair of transparent plates and shiftable in the film conveying direction, and the transverse direction; and a pedestal portion including guide portions for shifting said roll carrier and said fiche carrier horizontally in the same plane between respective predetermined retard positions and respective application positions;

wherein, in said film supply portion of said film conveying mechanism, a film supply shaft can be exchanged in accordance with a shape of the rolled film held at said film supply portion, and, when the rolled film contained in said cartridge is mounted and dismounted with respect to said film supply portion of said roll carrier, a lower surface of said cartridge is received on an upper surface of a projection glass portion of said fiche carrier to provide a cartridge mounting/dismounting guide surface of said film supply portion of said roll carrier.

7. A film carrier which is mounted on a film projecting device and in which both a rolled film and a sheet film can be used, the film carrier comprising:

a roll carrier for holding a rolled film of an open-reel type or a rolled film contained in a cartridge at a film supply portion and for supplying and returning the rolled film between said film supply portion and a take-up reel to retrieve any frame recorded on the film;

a fiche carrier for holding a sheet film between upper and lower glass plates of a projection glass portion and capable of retrieving any frame recorded on the film; and a pedestal portion including guide portions for shifting said roll carrier and said fiche carrier horizontally in the same plane between respective predetermined retard positions and respective application positions;

wherein, in said film supply portion of said roll carrier, a film supply shaft can be exchanged in accordance with a shape of the rolled film held at said film supply portion, and, when the rolled film contained in said cartridge is mounted and dismounted with respect to said film supply portion of said roll carrier, a lower surface of said cartridge is received on an upper surface of said projection glass portion of said fiche carrier or on a part of said fiche carrier situated at a position substantially the same height as the upper surface of said projection glass portion to provide a cartridge mounting/dismounting guide surface for said film supply portion of said roll carrier.

8. A film carrier according to claim 7, wherein said cartridge containing the rolled film is mounted on and secured to said film supply portion of said roll carrier by (i) two hook pawls to be hooked to upper and lower recessed portions disposed at a film discharge opening of said cartridge, and (ii) a cartridge securing member for urging a surface of said cartridge opposite to said film discharge opening in a direction perpendicular to a film conveying direction while urging said surface toward said hook pawls.

9. A film carrier according to claim 7, wherein, when one of said roll carrier and said fiche carrier tries to be shifted from its predetermined retard position to its application position, if the other carrier is not located at its predetermined retard position, a part of members of the other carrier prevents the one carrier from shifting to the application position.

10. A film carrier according to claim 7, wherein a gravity center of said roll carrier is located in the vicinity of said guide member for shifting said roll carrier.

11. A film projecting apparatus comprising:
- an optical system including a projection lens for projecting an image of a film; and
- a film carrier mounted at a predetermined position across a film projecting light path, said film carrier comprising (i) a roll carrier adapted to hold a rolled film and having a pair of transparent plates defining a rolled film convey path therebetween and shiftable to cause said pair of transparent plates to enter into or retard from said projecting light path, (ii) a fiche carrier adapted to hold a sheet film between a pair of transparent plates and shiftable to cause said pair of transparent plates to enter into or retard from said projecting light path, and (iii) a supporting stage for supporting said roll carrier and said fiche carrier for horizontally shifting movements in the same plane, and said roll carrier and said fiche carrier capable of being shifted between a respective predetermined retard position and a respective application position.

12. A film projecting apparatus according to claim 11, wherein said roll carrier and said fiche carrier have guiding portions for engaging with a lower surface of said projection lens, respectively, and, when one of said carriers is shifted below said projection lens, said projection lens is guided to an upper surface of an upper transparent plate of said pair of transparent plates of said one carrier along the corresponding guiding portions.

13. A film projecting apparatus according to claim 11, further comprising guide portions forming a side surface of said supporting stage.

* * * * *

UNITED STATES PATENT AND TRADEMARK OFFICE
CERTIFICATE OF CORRECTION

PATENT NO. : 6,078,383
DATED : June 20, 2000
INVENTOR(S): MINORU SASHIDA

It is certified that error appears in the above-identified patent and that said Letters Patent is hereby corrected as shown below:

<u>COLUMN 22</u>:

```
Line 10, "positions;" should read --positions,--.
Line 38, "positions;" should read --positions,--.
```

Signed and Sealed this

Twenty-second Day of May, 2001

Attest:

NICHOLAS P. GODICI

*Attesting Officer*     *Acting Director of the United States Patent and Trademark Office*